United States Patent [19]

Ohba et al.

[11] Patent Number: 5,459,830
[45] Date of Patent: Oct. 17, 1995

[54] ANIMATION DATA INDEX CREATION DRAWN FROM IMAGE DATA SAMPLING COMPOSITES

[75] Inventors: Akio Ohba; Toshiro C. Watanabe; Hideo Terasawa, all of Kanagawa, Japan

[73] Assignee: Sony Corporation, Tokyo, Japan

[21] Appl. No.: 912,236

[22] Filed: Jul. 10, 1992

[30] Foreign Application Priority Data

| Jul. 22, 1991 | [JP] | Japan | 3-181001 |
| Jul. 22, 1991 | [JP] | Japan | 3-181010 |
| Jul. 22, 1991 | [JP] | Japan | 3-181018 |

[51] Int. Cl.⁶ ............................................. G06T 7/20
[52] U.S. Cl. ............................................. 395/152
[58] Field of Search ............................. 395/152, 154; 345/121, 122; 348/155

[56] References Cited

U.S. PATENT DOCUMENTS

| 2,586,772 | 2/1952 | Ashby et al. | 348/155 X |
| 4,091,415 | 5/1978 | Limb et al. | 348/155 X |
| 4,580,782 | 4/1986 | Ochi | 345/122 X |
| 4,698,664 | 10/1987 | Nichols et al. | 348/184 |
| 4,896,291 | 1/1990 | Gest et al. | 395/156 |
| 4,920,423 | 4/1990 | Shiota | 358/335 |
| 4,951,147 | 8/1990 | Aknar et al. | 348/155 X |
| 5,083,201 | 1/1992 | Ohba | 345/122 X |
| 5,093,907 | 3/1992 | Hwong et al. | 395/152 |
| 5,111,409 | 5/1992 | Gasper et al. | 395/152 |
| 5,113,493 | 5/1992 | Crosby | 395/152 |
| 5,189,402 | 2/1993 | Naimark et al. | 345/122 |
| 5,214,758 | 5/1993 | Ohba et al. | 395/152 X |
| 5,237,648 | 8/1993 | Mills et al. | 395/152 X |
| 5,252,953 | 10/1993 | Sandrew et al. | 345/122 |
| 5,255,190 | 10/1993 | Sznaider | 364/420 |
| 5,353,392 | 10/1994 | Luquet et al. | 395/152 X |

FOREIGN PATENT DOCUMENTS

| 2260075 | 10/1990 | Japan . |
| 2136653 | 9/1984 | United Kingdom . |

OTHER PUBLICATIONS

Tonomura, Content Oriented Visual Interface Using Video Icons for Visual Database Systems, IEEE Workshop on Visual Languages, Oct. 1989, pp. 68–73.

*Primary Examiner*—Mark K. Zimmerman
*Assistant Examiner*—Anton W. Fetting
*Attorney, Agent, or Firm*—Jay H. Maioli

[57] ABSTRACT

An image data processing apparatus by which a general flow of images can be grasped readily and an editing operation can be performed at a high efficiency includes a sample data producing unit for one-dimensionally sampling animation image data successively received from an animation image generating source in one direction while successively moving the sampling position in the other direction to produce data of a still image, a display screen for displaying thereon a group of such still images of the still image data received from the sample data producing unit, point designating and area designating units for designating a predetermined point and a predetermined area of the still images displayed on the display, and a time code converting unit for producing time codes corresponding to the point and the area designated by the point and area designating units, respectively.

21 Claims, 22 Drawing Sheets

ANIMATION DATA INDEX CREATION DRAWN FROM IMAGE DATA SAMPLING COMPOSITES

BACKGROUND OF THE INVENTION

1. Field of the Invention

This invention relates to an image data processing apparatus suitably applied for retrieval or edition of, for example, a video tape.

2. Description of the Prior Art

Confirmation of an outline or selection of a desired cut of a material on which a subject matter is recorded as visible images such as a cinema film can be performed only by visually observing the material. On the other hand, in the case of another material on which animation image data are recorded in an invisible condition such as a video tape or a video disk, various methods are employed in order to find out an outline of the subject manner of the material, including (a) a method wherein the subject manner is displayed by screen on a monitor display and a high speed search is performed when necessary, and (b) another method wherein animation images of a plurality of frames are displayed in a reduced scale in a scrolling manner on a monitor display using a multiscreen displaying technique (refer to Japanese Patent Publication Application No. 81-44437).

Meanwhile, since a large amount of information is recorded for a long period of time on a video tape, it is a popular practice that index labels are applied to various recorded contents of a video tape in order to make the recorded contents clear.

However, the first method (a) described above is disadvantageous in that the efficiency in editing a video tape is low because confirmation of an outline of the subject matter of the video tape of a television program, for example, for one hour requires a time longer than that. Meanwhile, the second method (b) is disadvantageous in that comparatively short cuts, for example, of a television commercial are sometimes overlooked and there is no reproducibility in confirmation but there is a dispersion in such confirmation among operators. Accordingly, an image data processing apparatus is required by which a general flow of images can be grasped readily and besides accurate retrieving and editing operations can be performed at a high efficiency.

In the case of the popular practice making use of index labels, since an outline entered on an index label is a representation of a few words, it is difficult to know recorded contents of the tape in detail from the index label. Particularly, with a non-edited video tape recorded by means of a video tape recorder integrated with a camera, it is difficult even to summarize its contents.

It is to be noted that, while an index can be produced using a video printer, it involves complicated operations including extraction of representative images, addition of basic data such as a time and layout. Accordingly, production of an index using a video printer is not in widespread use.

SUMMARY OF THE INVENTION

It is an object of the present invention to provide an image data processing apparatus by which a general flow of images can be grasped readily.

It is another object of the present invention to provide an image data processing apparatus by which an editing operation can be performed at a high efficiency.

In order to attain the objects, according to one aspect of the present invention, there is provided an image data processing apparatus, which comprises an animation image generating source for supplying data of a series of animation images to be displayed two-dimensionally on a display screen, sample data producing means for one-dimensionally sampling the animation image data successively received from the animation image generating source in one direction while successively moving the sampling position in the other direction and producing data of a still image from the thus sampled animation image data, display means having a display screen for displaying thereon a group of such still images of the still image data received from the sample data producing means, point designating means for designating a predetermined point of the still images displayed on the display means, and time code converting means for producing a time code corresponding to the point designated by the point designating means.

According to another aspect of the present invention, there is provided an image data processing apparatus, which comprises an animation image generating source for supplying data of a series of animation images to be displayed two-dimensionally on a display screen, sample data producing means for one-dimensionally sampling the animation image data successively received from the animation image generating source in one direction while successively moving the sampling position in the other direction and producing data of a still image from the thus sampled animation image data, display means having a display screen for displaying thereon a group of such still images of the still image data received from the sample data producing means, area designating means for designating a predetermined area of the still images displayed on the display means, and time code converting means for producing a time code corresponding to the area designated by the area designating means.

According to a further aspect of the present invention, there is provided an image data processing apparatus, which comprises an animation image generating source for supplying data of a series of animation images to be displayed two-dimensionally on a display screen, sample data producing means for one-dimensionally sampling the animation image data successively received from the animation image generating source in one direction while successively moving the sampling position in the other direction and producing data of a still image from the thus sampled animation image data, display means having a display screen for displaying thereon a group of such still images of the still image data received from the sample data producing means, point designating means for designating a predetermined point of the still images displayed on the display means, area designating means for designating a predetermined area of the still images displayed on the display means, and time code converting means for producing a time code corresponding to the point designated by the point designating means and another time code corresponding to the area designated by the area designating means.

According to a still further aspect of the present invention, there is provided an image data processing apparatus, which comprises an animation image generating source for supplying data of a series of animation images to be displayed two-dimensionally on a display screen, sample data producing means for one-dimensionally sampling the animation image data successively received from the animation image generating source in one direction while successively moving the sampling position in the other direction and producing data of a still image from the thus sampled animation image data, display means having a display screen for displaying thereon a group of such still images of the still image data received from the sample data producing means, a memory for storing therein data of basic formats for an index, selecting means for selecting one of the format data from the memory, data processing means for arranging the still picture images in accordance with the basic format data selected by the selecting means to produce an index, and a video memory for storing therein data of the index produced by the data processing means.

The image data processing apparatus may further comprise means for successively detecting audio data corresponding to the animation image data to be displayed two-dimensionally, means for converting the detected audio data into visual data, and means for causing the visual data to be displayed on the display means.

In the image data processing apparatus, a series of still images each obtained by joining together a plurality of one-dimensional images corresponding to data obtained by one-dimensional scanning are displayed on the display means. Each of the still images can be confirmed as a still image wherein an outline of data of a series of animation images is compressed in a corresponding relationship to the lapse of time. For example, when the animation image changes suddenly such as, for example, upon insertion of a commercial, an intermittent line appears at a predetermined position of a still image. Consequently, a general flow of images can be recognized with a high degree of accuracy.

Further, a time code corresponding to a predetermined point or a predetermined area of a still image designated by the designating means is obtained. The time code corresponding to the predetermined point relates to animation image data of a frame having a one-dimensional image at the predetermined point. Further, the time code corresponding to the predetermined area relates to animation image data of frames having, for example, the first and last one-dimensional images of the area. Therefore, an accurate retrieving or editing operation can be performed efficiently using the time codes.

Since an outline of audio data is displayed successively in a corresponding relationship to the lapse of time on the display means, a general flow of sound can be recognized with a high degree of accuracy, and accordingly, an accurate retrieving or editing operation can be performed efficiently.

With the image data processing apparatus, since an index is produced using a basic format, an index can be produced by a simple operation without the necessity of complicated operations such as extraction of a representative image, addition of basic data such as time and layout. Further, since an index which can be visually confirmed is produced by processing of input image data (production of a video index or a reduced sample scene or the like) is produced, recorded contents can be discriminated in detail compared with an alternative image data processing apparatus which summarizes recorded contents and represents same in words.

Further, since the basic formats stored in the memory can be added, changed or deleted arbitrarily, various indices can be produced in accordance with the necessity. Further, an index is produced by suitably arranging video indices and/or reduced sample scenes, recorded contents can be visually recognized readily. Besides, a reduced sample scene can be modified in an interactive fashion while referring to a video index, and accordingly, an index having a desired reduced sample scene can be produced efficiently.

Further, an index wherein a reduced sample scene is disposed corresponding to a frame image for the time of each starting of recording can be produced for a video tape recorded with a video tape recorder integrated with a camera. Thus, an effective index from which a scene changing screen can be known readily can be produced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 2:
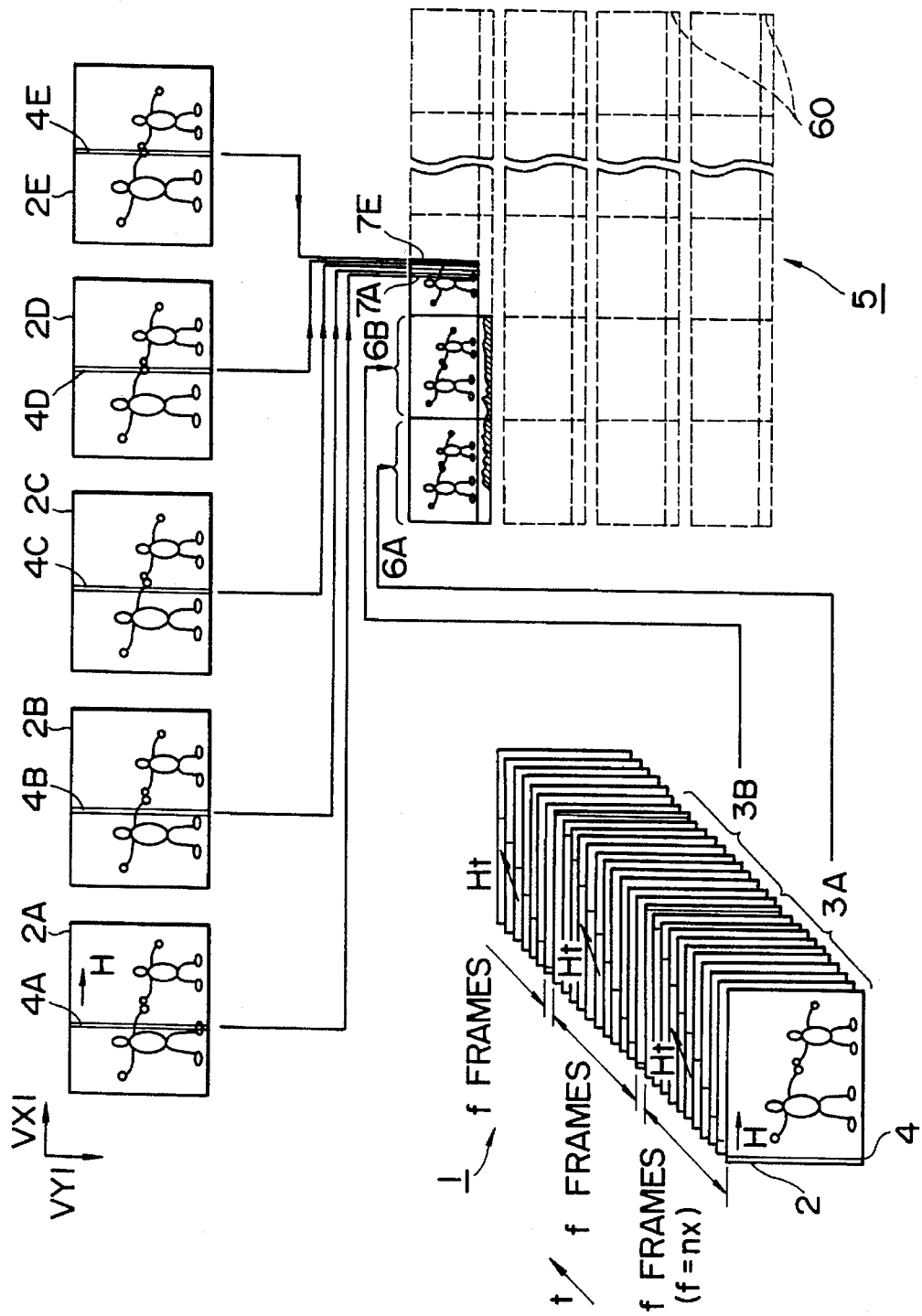
FIG. 2 is a diagrammatic view illustrating a concept of a video index produced on the image data processing apparatus of FIG. 1.

Referring first to FIG. 2, there is illustrated processing of animation image data for producing a video index. A video image set 1 which makes an object for edition can be considered as an array wherein animation images corresponding to data of a series of animation images is recorded, for example, on a video tape or a video disk are arranged in the unit of frames 2 in the direction of time (t-axis).

Since the frame frequency of a video signal is 30 Hz in the NTSC system, thirty frames 2 are involved for one second as a video image set 1. A series of frames of the video image set 1 are denoted at 2A to 2E.

A vertical slit (input slit) 4 for inputting of image data is set on a frame 2 such that an image of the frame is sampled by the vertical slit 4. The vertical slit 4 is scanned at a predetermined velocity in a horizontal (H) direction, and after it reaches the right end of the frame 2, it is repetitively scanned in the horizontal direction from the left end of the frame 2. Accordingly, the vertical slit 4 is scanned in the oblique direction indicated by an arrow mark Ht in the three-dimensional spacing including the time axis.

It is assumed that, when the vertical slit 4 is scanned on the video image set 1 in the direction Ht from the left-hand side end to the right-hand side end, it crosses f frames 2 so that a slit-shaped image is sampled for n frames (normally n=1) by the vertical slit 4.

If f is selected to be a multiple of n, then, using a predetermined integral number X, the following equation stands:

$$f = nX$$

and thus, X slit-shaped images are sampled from each group (3A, 3B or the like) of frames which is composed of f frames 2.

In an image data processing apparatus of an embodiment of the present invention described below, the time required for the vertical slit 4 is scanned in the direction Ht from the left end to the right end of the video image group 1 is set to 12 seconds and n is set to n=1, and consequently, $$f = X = 12 + 30 = 360$$

Then, X slit-shaped images obtained from the frame group 3A are joined together in the horizontal direction and then compressed in the horizontal and vertical directions to form a reduced composite picture 6A. The reduced picture 6A is fitted into a display screen 5 corresponding to one frame memory. Similarly, X slit-shaped images obtained from the frame group 3B are joined together in the horizontal direction and then compressed to form a reduced picture 6B, and the reduced screen 6B thus formed is fitted to a position next to the reduced screen 6A in the display screen 5.

Reproduced screens are formed in a similar manner from the succeeding groups of frames and are successively fitted into the display screen 5.

Actually, since slit-shaped images sampled by the vertical slit 4 are produced one by one in a time series relationship, they are compressed and fitted one by one into the display screen 5 in the order of their production. For example, vertical slits 4A to 4E are allotted to the frames 2A to 2E such that they are successively scanned in the direction indicated by an arrow mark H. Images on the slits sampled by the vertical slits 4A to 4E are individually compressed and employed as images at vertical slits (output slits) 7A to 7E, respectively, of the display screen 5.

As the method of compressing images sampled by the vertical slits 4A to 4E, a method of merely thinning out image data or a method of calculating a weighted average within a predetermined region may be employed. When the method of merely thinning out image data is employed, each of the slits 4A to 4E may have a width for one picture element in the direction H.

A sound displaying portion 60 is provided at a location below each of the reduced pictures in the display screen 5. In each of the sound displaying portions 60, a sound level Ea is displayed corresponding to each of slit-shaped images which constitute the corresponding reduced picture. In this instance, a display at the sound displaying portion 60 corresponding to each reduced screen is provided in a color corresponding to a kind of sound in the reduced screen such as, for example, a voice of a person or music.

It is to be noted that processing for producing such a reduced sample scene is such that picture elements constituting, for example, an image of a frame are thinned out to obtain picture elements corresponding to a reduced sample scene and the picture elements thus obtained are fitted into the display picture 5.

Figure 1:
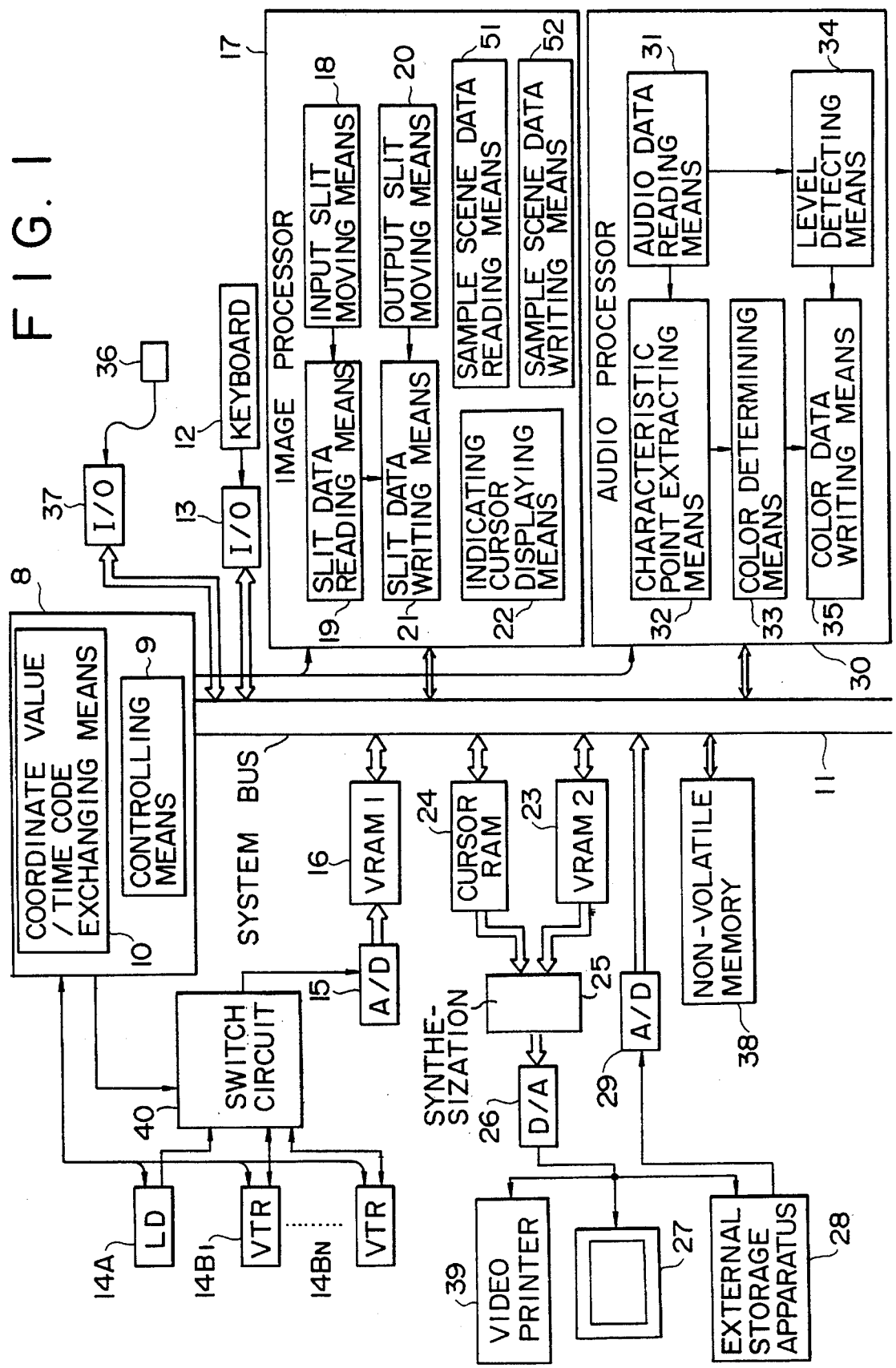
FIG. 1 is block diagram of an image data processing apparatus showing a first preferred embodiment of the present invention.

Referring now to FIG. 1, there is shown an image data processing apparatus according to a preferred embodiment of the present invention. The image data processing apparatus is generally constructed such that a video index can be produced from animation image data and retrieving and editing operations can be performed using a display of a video index.

The image data processing apparatus includes a host computer 8 which functions as controlling means 9 for the entire apparatus for executing production of an index, retrieval and edition of an image and so forth and also as coordinate value to time code converting means 10 and so forth.

The image data processing apparatus further includes a system bus 11, a keyboard 12 and a mouse 36. An operator can thus input various commands from the keyboard 12 and the mouse 36 to the host computer 8 by way of input/output circuits 13 and 37, respectively, and the system bus 11.

The image data processing apparatus further includes a video disk apparatus 14A serving as an animation image data source, N video tape recorders 14B1 to 14BN each serving also as an animation image data source, and a plurality of analog to digital (A/D) converters 15. A switch circuit 40 switches inputting and outputting of a video signal among the video disk apparatus 14A and the video tape recorders 14B1 to 14BN and switches a video signal to be supplied to the A/D converters 15.

The image data processing apparatus further includes a memory (VRAM1) 16. A video signal or signals (for example, Y, R-Y and B-Y signals or a component signals of R, G and B) outputted from the switch circuit 40 are first converted into digital data by the A/D converters 15 and then written into the memory 16. The memory 16 has an area defined therein such that it can store a video signal and an audio signal for one frame therein.

Thus, a video signal or signals outputted from the video tape recorder 14B1 (for example, Y, R-Y and B-Y signals or a component signal of R, G and B) are first converted into digital data by the A/D converters 15 and then written into the memory 16. Also an audio signal outputted from the video tape recorder 14B1 is converted into digital data by one of the A/D converters 15 and then written into the memory 16. Also upon production of a reduced sample scene, image data of the memory 16 for one frame are read by an image processor 17, and compression (thinning out) is performed for picture elements of a reduced sample scene and image data obtained by such compression are written into a portion of a video RAM (random access memory) 23 corresponding to the reproduced sample turn.

Figure 3:
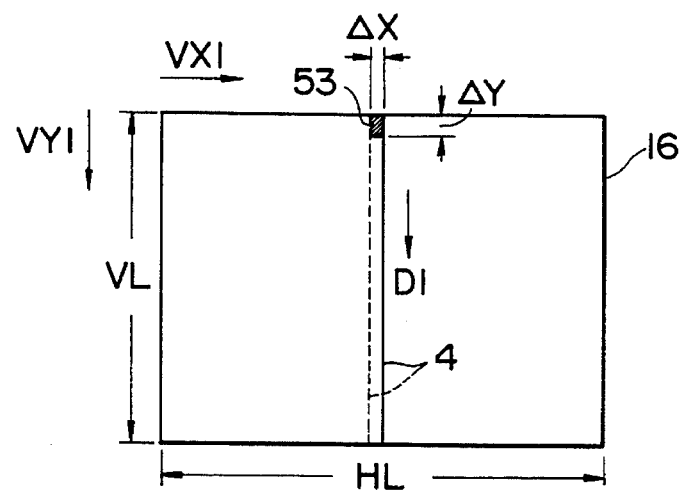
FIG. 3 is a diagrammatic view illustrating a structure of data of a video RAM of the image data processing apparatus of FIG. 1.

As shown in FIG. 3, a video signal storage area of the memory (VRAM1) 16 has, in conformity with an actual display screen, HL dots in the horizontal direction (direction indicated by an arrow mark VX1) and VL dots in the vertical direction (direction indicated by an arrow mark VY1). An address of each picture element data read out from the memory 16 is represented by coordinates (VX1, VY1) ($0 \leq VX1 \leq HL-1$, $0 \leq VY1 \leq VL-1$). Upon production of an index, data of that portion of image data of the memory 16 for one frame which are surrounded by the vertical slit 4 (refer to FIG. 3) are read by an image processor 17, and the data thus read are compressed and then written into that portion of the video RAM (VRAM2) 23 formed from a frame memory which is surrounded by a vertical slit (output slit) 7 (refer to FIG. 4).

The image processor 17 further has a function of displaying an indicating cursor on a screen corresponding to the video RAM 23. The cursor is used upon interactive setting in production of an index in accordance with a flow shown, for example, in FIGS. 20 or 21.

Figure 4:
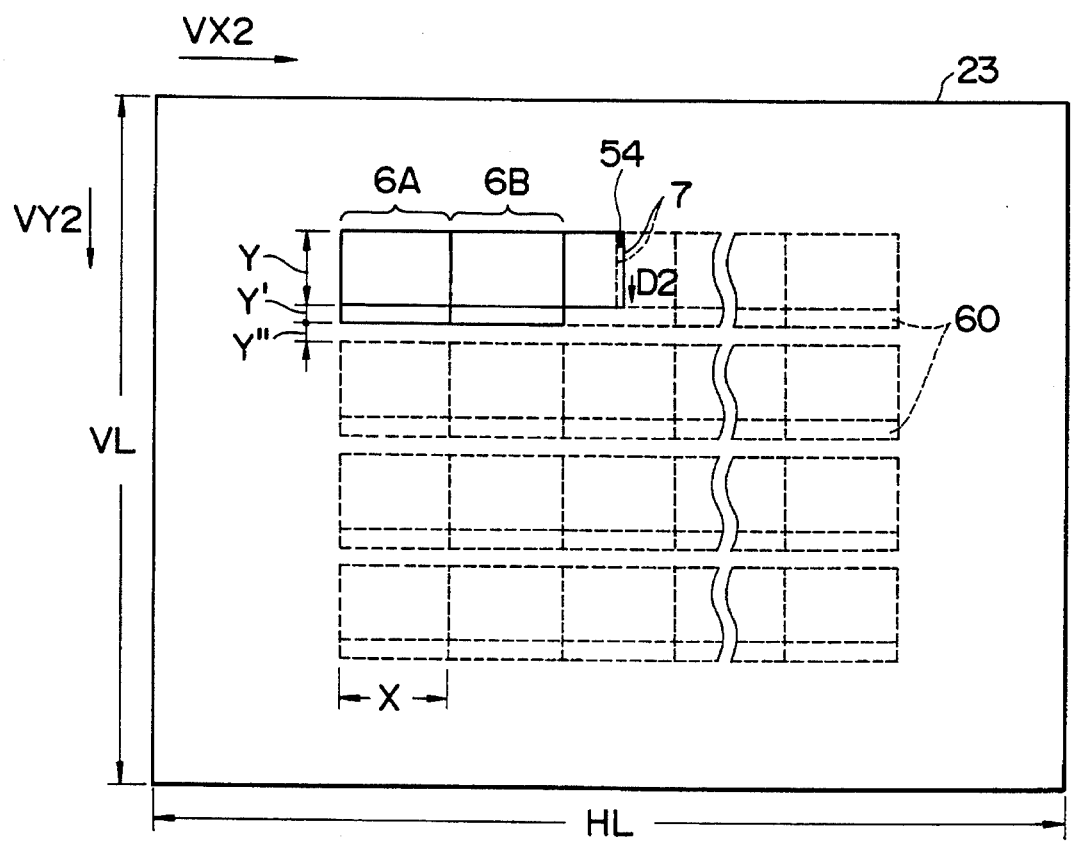
FIG. 4 is a diagrammatic view illustrating a detailed structure of data of another video RAM of the image data processing apparatus of FIG. 1.

If the image processor 17 is represented as a congregation of means corresponding to different functions, then it includes input slit moving means 18, slit data reading means 19, output slit moving means 20, slit data writing means 21, sample scene data reading means 51, sample scene data writing means 52 and indicating cursor displaying means 22. Also a storage area of the video RAM (VRAM2) 23 similarly has, as shown in FIG. 4. HL dots in the horizontal direction (direction indicated by an arrow mark VX2) and VL dots in the vertical direction (direction indicated by an arrow mark VY2) in a corresponding relationship to an actual screen. An address of each picture element data to be written into the video RAM 23 is represented by coordinates (VX2, VY2).

The image data processing apparatus further includes a cursor RAM 24 for storing therein data of the cursor and a pointer which are used, for example, upon retrieval or edition. Picture element data read out from the video RAM 23 and data of the cursor and the pointer read out from the cursor RAM 24 are supplied to a synthesizing circuit 25, at which synthesis image data are formed.

Image data as an index read out from the video RAM 23 are converted into an analog signal by a digital to analog (D/A) converter 28 and then supplied to a monitor display unit 27 and a video printer 39 and also to an external storage apparatus 28 which may be a video tape recorder or a floppy disk apparatus.

Thus, the cursor is displayed on the screen of the monitor 27 in a superimposed relationship with an index thus produced. When interactive setting is necessitated upon production of an index, the cursor will be moved to successively set necessary items.

Meanwhile, the video printer 39 can print out the index thus produced, and the external storage apparatus 28 can store such index, for example, at the top of a video tape. It is to be noted that a video signal reproduced from the external storage apparatus 28 can be written into the video RAM 23 by way of an A/D converter 29 and the system bus 11.

The image data processing apparatus further includes an audio processor 30. Upon production of an audio index, audio data for one frame written in the memory 16 are read out and integrated by the audio processor 30 to detect an audio level Ea. Then, color data by an amount corresponding to the audio level Ea are written into a slit area of the sound displaying portion 60 below a vertical slit 7 of the video RAM 23.

Meanwhile, audio data are read out from the memory 16 for a period of time corresponding to a reduced picture, and for example, characteristic points are extracted from the audio data, for example, by a neural network. As a result of such extraction of characteristic points, the kind of sound as to a voice of a person, music and so forth is discriminated, and a color is selected from a color map in accordance with the kind thus discriminated. Data of the color will be written into the sound displaying portion 60 below the corresponding reduced picture as described above.

It is to be noted that, in this instance, it is otherwise possible to employ such a simple structure which selects a color from a color map in accordance with the sound level Ea.

If the audio processor 30 is represented as a congregation of means corresponding to functions, then it includes audio data reading means 31, characteristic point extracting means 32, color determining means 33, level detecting means 34 and color data writing means 35.

The image data processing apparatus further includes a re-writable non-volatile memory 38 (corresponding to a memory 80 of FIG. 15) for forming basic format data for an index therein. The memory 38 can store data of a plurality of basic formats therein (refer to FIGS. 16 to 19). Such basic format data are added, modified or deleted in accordance with the necessity using the keyboard 12 or the mouse 36.

When one of the basic formats is selected from the memory 38 using the keyboard 12 or the mouse 36, the host computer 8 will control so that an index may be produced in accordance with the basic format (FIGS. 20 to 23).

Figure 5:
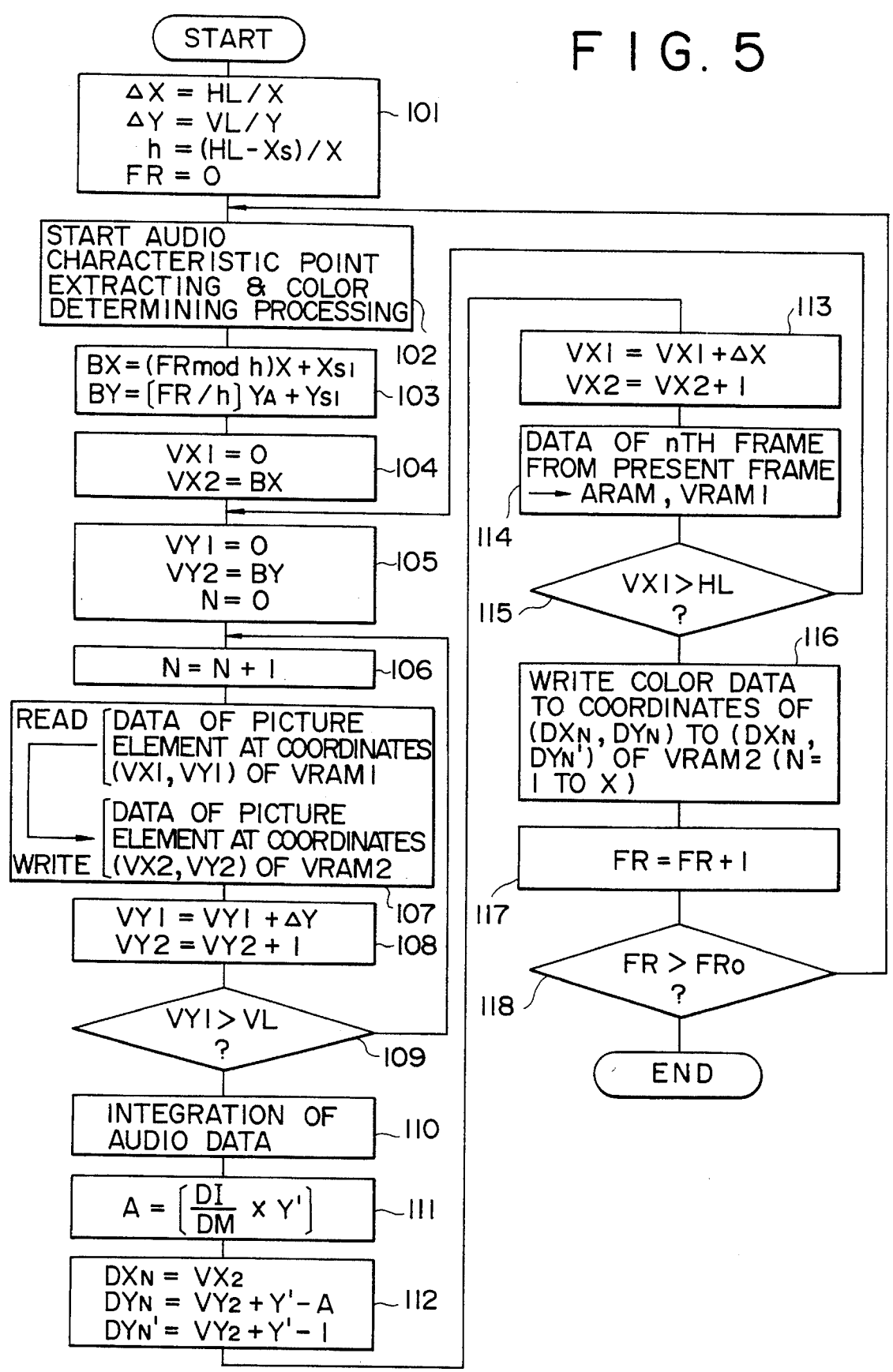
FIG. 5 is a flow chart illustrating operation of the image data processing apparatus of FIG. 1 for production of a video index.

Subsequently, a series of operations when image data of a video image set 1 outputted from one of the video disk apparatus 14A and the video tape recorders 14B1 to 14BN, for example, from the video tape recorder 14B1, are written as a series of slit data into the video RAM 23 (shown in FIG. 4) by way of the memory 16 (shown in FIG. 3) and color data representative of a sound level Ea and a kind of sound are written into the video RAM 23 in accordance with audio data, that is, operation for producing a video index and an audio index, is described in detail for individual steps in accordance with the flow chart of FIG. 5.

In this instance, it is assumed that data of X slits extracted one by one from individual frames of the memory 16 and then compressed are written into the video RAM 23 as reduced images 6A, 6B, . . . each composed of X×Y picture elements.

[Step 1]

$\Delta X$ and $\Delta Y$ are calculated in accordance with the following equations:

$$\Delta X = HL/X$$

$$\Delta Y = VL/Y$$

$\Delta X$ and $\Delta Y$ need not be integral numbers, and picture element data of a block 53 which is composed of $\Delta X \times \Delta Y$ picture elements are compressed into a value of a single picture element 54 of the video RAM 23.

In the image data processing apparatus of the present embodiment, in order to facilitate compression, data of a picture element the address of which is the coordinates (VX1, VY1) of the left top corner of the block 53 of the memory 16 are determined as they are as data of a picture element 54 the address of which is the coordinates (VX2, VY2) of the video RAM 23. In case ΔX or ΔY is not an integral number, the coordinates (VX1, VY1) do not make a pair of integral numbers, and accordingly, a value of a picture element indicated by the coordinates (VX1, VY1) is calculated by interpolation from values of picture elements around the picture element.

Further, an array number h in the horizontal direction of reduced screens 6A, 6B and so forth) each composed of X vertical slits 7 in the video RAM 23 is calculated in accordance with the following equation:

$$h=(HL-Xs)/X$$

where Xs is the number of picture elements in a margin in the horizontal direction.

Further, the sequential numbers FR of the reduced screens 6A, 6B, . . . are represented as 0, 1, . . . , and FR0, and the number FR is initially set to FR=0.

Further, image data for one frame outputted from the video tape recorder 14B1 are written into the memory 16, and audio data outputted in a corresponding relationship from the video tape recorder 14B1 are written into the memory 16. Then, a time code (for example, minute, second and frame) of the frame is stored as a start time code into a memory not shown of the host computer 8. The start time code is used when a time code is to be calculated from a mouse point.

[Step 102]

Audio data are read out from the memory 16, and processing for extraction of characteristic points and determination of a color is started at the audio processor 30.

[Step 103]

Coordinates (BX, BY) of the left top corner of a reduced screen (6A, 6B or the like) of the number FR of the video RAM 23 are calculated in accordance with the following equations:

$$BX=(FR \bmod h) X+Xs1$$

$$BY=[FR/H] YA+Ys1$$

where Xs1 is a number of picture elements in the left end margin, Ys1 is a number of picture elements in the top margin in the vertical direction, and YA=Y+Y'+Y" where Y' is a number of picture elements of the sound displaying portion 60 in the vertical direction and Y" is a number of picture elements between the sound indicating portion 60 and the reduced screen in the vertical direction (refer to FIG. 4). Further, in the equations above, (FR mod h) represents a remainder of FR/h, and [FR/h] represents a maximum integral number which does not exceed FR/h.

[Step 104]

Initial values of the coordinate VX1 of the vertical slit 4 of the memory 16 and the coordinate VX2 of the vertical slit 7 of the video RAM 23 are set to 0 and BX, respectively.

[Step 105]

Initial values of the coordinate VY1 of the vertical slit 4 of the memory 16 and the coordinate VY2 of the vertical slit 7 of the video RAM 23 are set to 0 and BY, respectively. Further, the number N is set to

[Step 106]

The number N is incremented by 1.

[Steps 107 and 108]

The image processor 17 reads data of the picture element at the coordinates (VX1. VY1) of the memory 16 and writes the data as data of the picture element at the coordinates (VX2, VY2) of the video RAM 23, and then increments the coordinate values VY1 and VY2 by 1.

[Step 109]

When data of the vertical slit 4 of the memory 16 are read out in the direction indicated by an arrow mark D1 in FIG. 3, data of the vertical slit 7 of the video RAM 23 are written in the direction indicated by an arrow mark D2 in FIG. 4. Then, when the coordinate VY1 of the vertical slit 4 of the memory 16 is equal to or lower than VL, the control sequence advances to step 106, but on the contrary when the coordinate VY1 exceeds VL, the control sequence advances to step 110.

[Step 110]

The audio processor 30 reads out all (or part) of audio data for one frame period written in the memory 16 and integrates them.

[Step 111]

Where an integration output corresponding to the number of picture elements of the sound indicating portion 60 of the video RAM 23 in the vertical direction 60 is represented by DM and the integration output of the audio processor 30 is represented by DI, the value A is calculated in accordance with the following equation:

$$A=[DI/DM \times Y']$$

where [DI/DM×Y'] represents a maximum integral number which does not exceed DI/DM×Y'. The data A indicate a sound level Ea.

[Step 112]

The values DXN, DYN and DYN' are set in the following manner:

DXN=VX2

DYN=VY2+Y'−A

DYN'=VY2+Y'−1

[Steps 113 and 114]

The coordinate value VX1 is incremented by ΔX and the coordinate value VY1 is incremented by 1. This signifies that the position of the vertical slit 4 of the memory 16 is shifted by ΔX rightwardly while the position of the vertical slit 7 of the video RAM 23 is shifted by 1 rightwardly.

Then, the host computer 8 receives image data and audio data of the nth frame as counted from the present frame from the video tape recorder 14 and stores them individually into the memory 16.

[Step 115]

When the coordinate VX1 of the vertical slit 4 of the memory 16 is equal to or lower than HL, the control sequence returns to step 105. On the contrary when the coordinate VX1 exceeds HL, since this signifies that scanning of one cycle of the vertical slit 4 of the memory 16 in the horizontal direction is completed, the control sequence advances to step 116.

[Step 116]

Color data of colors determined by the audio processor 30 are written into the coordinates (DXN, DYN) to (DXN, DYN') of the video RAM 23. Here, N=1 to X. Consequently, color data representative of sound levels and kinds of sounds are written into the audio displaying portion 60 of the video RAM 23 in a corresponding relationship to image data of the slits.

[Steps 117 and 118]

The number FR for a reduced picture is incremented by 1, and when the thus updated number FR is equal to or lower than the number FR0 of a reduced screen allowed by the video RAM 23, the control sequence returns to step 102. On the contrary if the updated number FR exceeds the number FR0, this means that production of video indices for one screen is completed and the flow of operations comes to an end.

As after processing, image data of the video RAM 23 may be stored into the external storage apparatus 38 by way of the D/A converter 26 or may be supplied to the monitor display unit 27 by way of the D/A converter 26.

Figure 6:
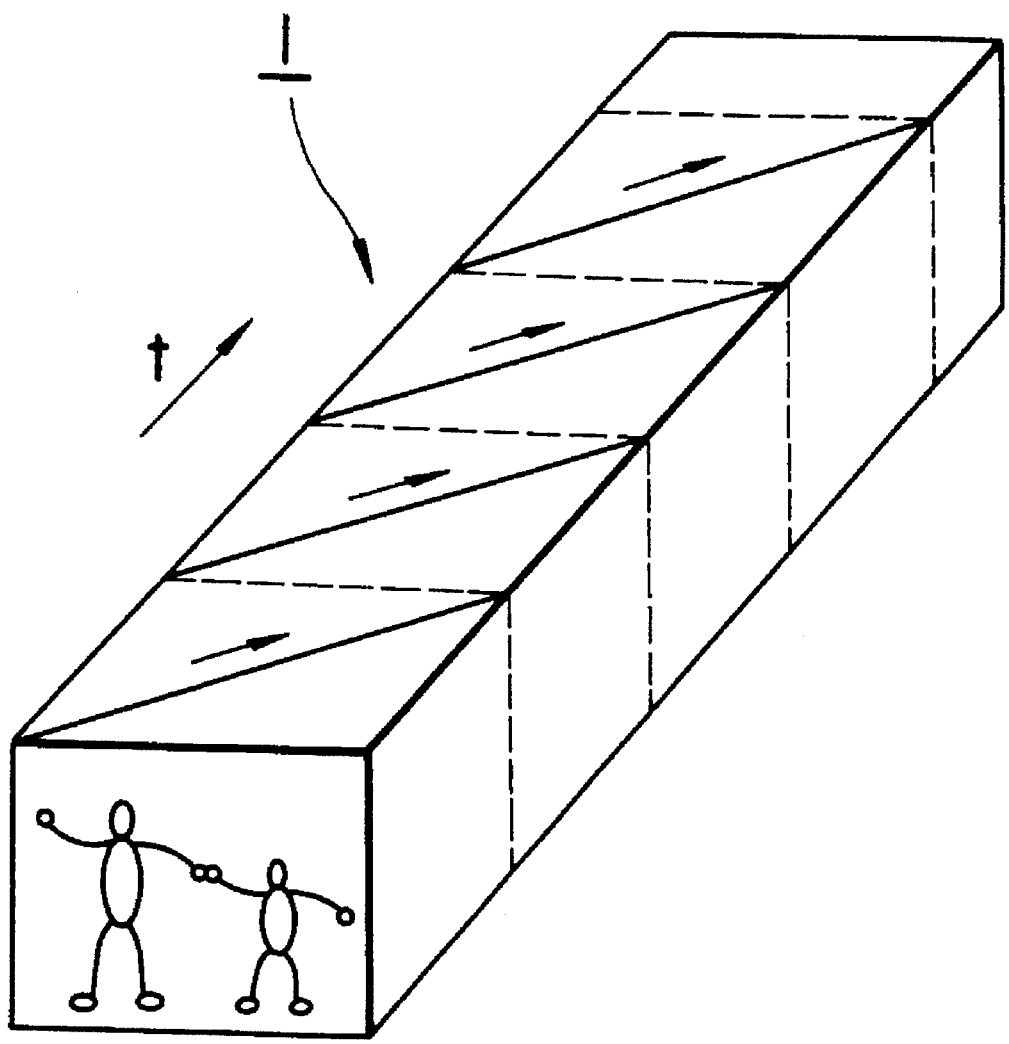
FIG. 6 is a diagrammatic view showing a relationship between an input video signal and a video index.

In this instance, a video image set 1 which is a congregation of animation image data are stored in the external storage apparatus 28 in the form in which they are data compressed by a method which can be represented as a kind of video slice (shown in FIG. 6). Meanwhile, a video index composed of a plurality of reduced screens is displayed on the monitor display unit 27.

After then, the control process will be returned to step 101 again in response to operation of the operator so that a video index for a continued video signal from the video tape recorder 14B1 will be produced.

A video index produced in such a manner as described above is a reduced screen wherein image data sampled changing the position of the vertical slit 4 for each n frames of the video image set 1 are compressed and joined together, and an outline of animation image data of the video image set 1 can be confirmed from the video index in a corresponding relationship to the lapse of time.

Here, since the position of the vertical slit 4 is changed such that it is scanned in 12 seconds from the left end to the right end of a screen, when, for example, 25 reduced screens 6A, 6B, ... are to be formed in the display screen 5, 12×25=300 (seconds)=5 (minutes)

30×12×25=9,000 (frames)

and consequently, animation image data of a video signal for 5 minutes (9,000 frames) are displayed in a compressed condition in one display screen (frame) 5. In this manner, a series of animation image data are compressed at a very high compression ratio.

Then, in case the animation image of the video image set 1 changes moderately with reference to 12 seconds, since the vertical slit 4 is scanned from the left end to the right end, a condition of original pictures of the animation image can almost be restored. On the other hand, if the animation image of the video image set 1 changes rapidly as, for example, in a commercial, then an intermittent line which changes intermittently will be formed in some of the reduced screens. Accordingly, although animation image data are displayed in a compressed condition at a very high compression ratio of about 1/9,000, an outline at a portion at which the animation image changes moderately can be confirmed while another portion at which the animation image changes rapidly can be confirmed as an intermittent line. It is to be noted that image data may be sampled from an individual frame 2 of the video image set 1 using a horizontal slit in place of the vertical slit 4. In this instance, the horizontal slit is periodically scanned at a predetermined speed in a vertical direction (V direction) from the top end to the bottom end of the frame 2.

Subsequently, retrieval and edition using a display of a video index are described. If the operator enters an instruction of reproduction (retrieval) and edition to the host computer 8 by way of the keyboard 12 after a video index has been produced in such a manner as described above, then image data constituting the video index are read out repetitively from the video RAM 23 and the video index is displayed on the monitor 27 (refer to FIG. 7).

In this instance, a scale 41 is displayed between adjacent ones of the reduced screens in the vertical direction, and an operation icon 42 which is operated by way of the mouse 36 is disposed at a right side portion of the screen. On such display screen 5, the image processor 17 is controlled by operation of the mouse 36 by the operator and an operation instruction by movement of a cursor 44 is entered.

Figure 7:
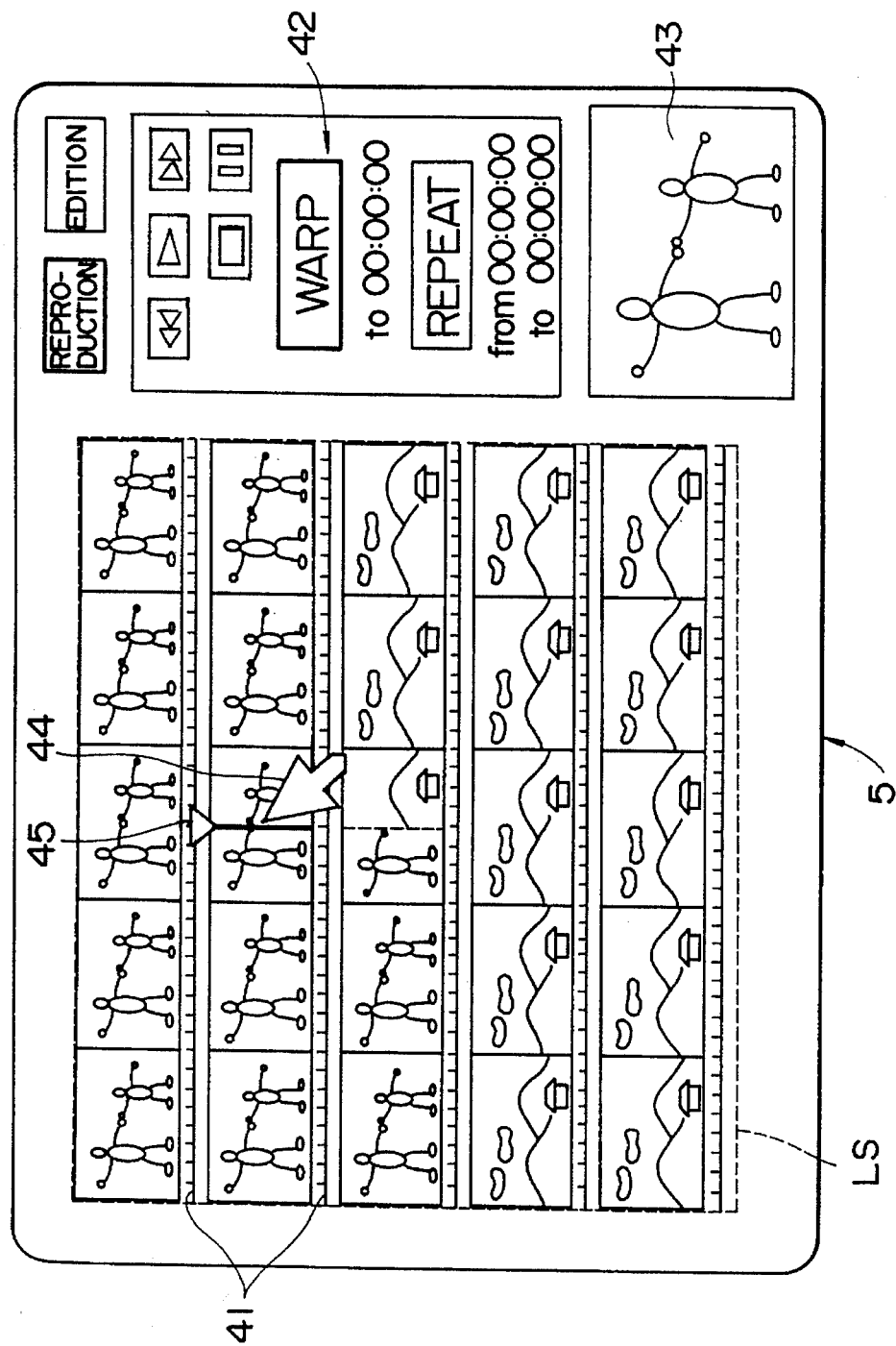
FIG. 7 is an illustration showing an exemplary display screen in a warp mode of the image data processing apparatus of FIG. 1.

FIG. 7 shows an exemplary display when the "REPRODUCTION" button is turned on to select a reproduction mode and the "WARP" button is turned on to put the image data processing apparatus into a warp mode. It is to be noted that broken lines LS indicate a VBRS area in which a plurality of reduced screens as video indices are included.

Figure 8:
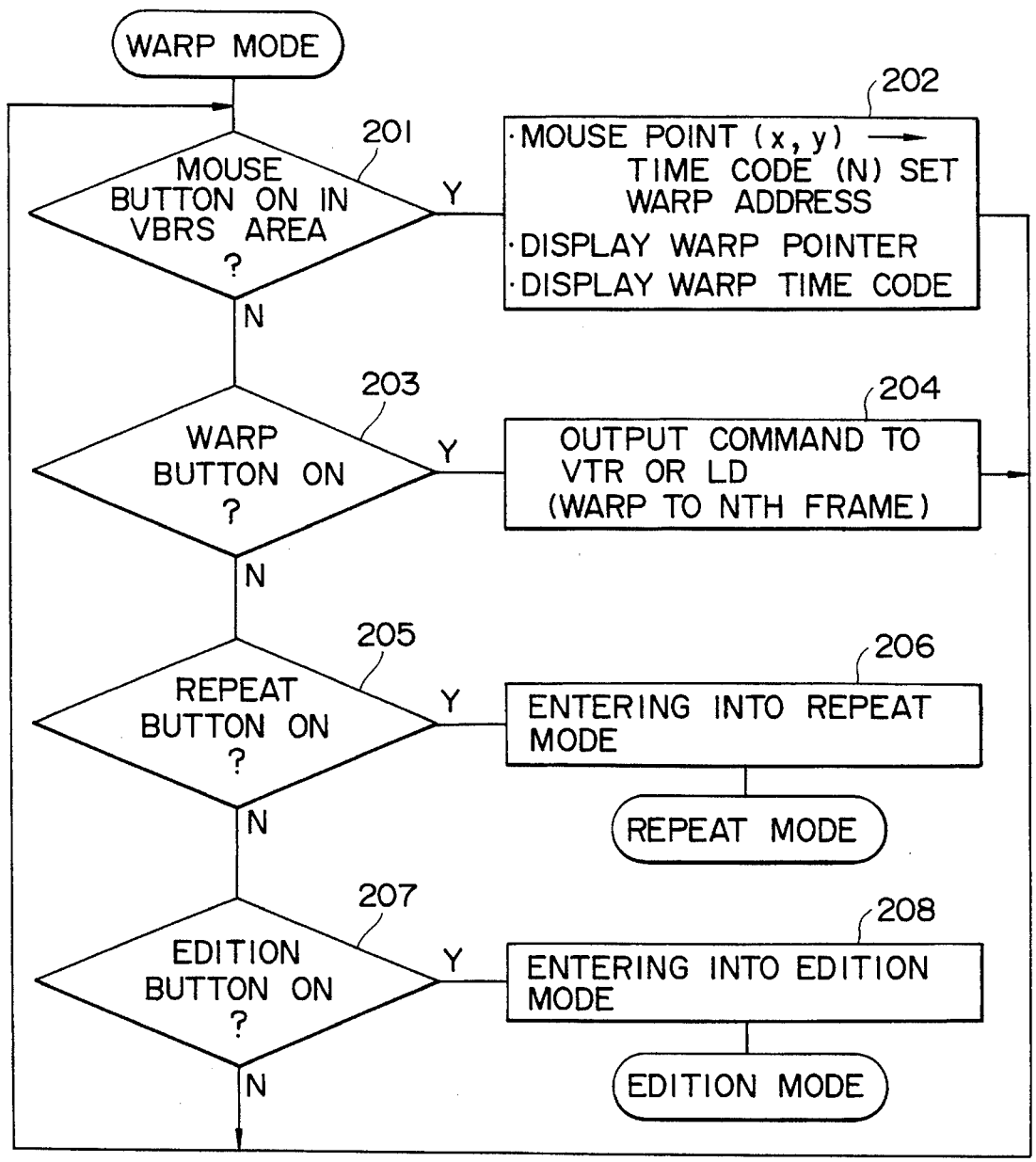
FIG. 8 is a flow chart illustrating operation of the image data processing apparatus of FIG. 1 in a warp mode.

FIG. 8 illustrates operation of the image data processing apparatus when it is in a warp mode. Referring to FIG. 8, at step 201, it is judged whether or not the mouse button is turned on while the cursor 44 is positioned within the VBRS area LS. When the mouse button is on, the mouse point (x, y) is converted into a time code N and a warp address is set to the time code N at step 202.

Here, the mouse point (x, y) represents coordinates of the displayed position of the cursor 44 on the video RAM 23. The mouse point (x, y) is changed by operation of the mouse 36 so that the cursor 44 is moved as described above. Meanwhile, the time code N represents a frame of animation image data having a slit-shaped image of a reduced image indicated by the cursor 44.

The start coordinates of the left upper corner of the VBRS area LS are presented by (sx, sy). From the description above with reference to the flow chart of FIG. 5, sx=Xs1 and sy=Ys1.

Figure 9:
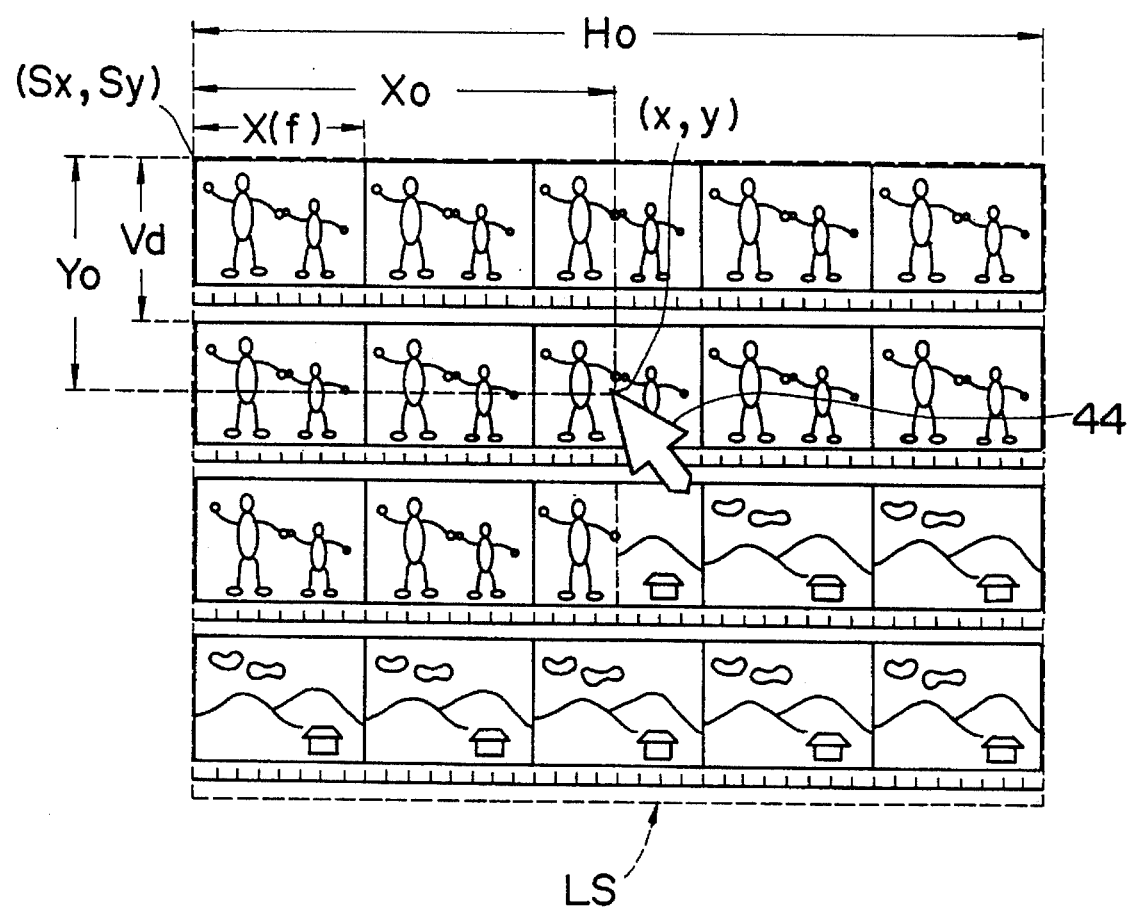
FIG. 9 is a diagrammatic view illustrating conversion of a mouse point to a time code.

If the number of picture elements in the horizontal direction from the start coordinates (sx, sy) to the mouse point (x, y) is represented by X0=x−sx, the number of picture elements in the vertical direction by Y0=y−sy, the number of picture elements in the VBRS area LS in the horizontal direction by H0 and the pitch of the reduced screens in the vertical direction by Vd as shown in FIG. 9, then the total number P of picture elements from the start coordinates (sx, sy) to the mouse point (x, y) in the horizontal direction is given by $$P=H0\times[Y0/Vd]+X0$$

where [Y0/Vd] represents a maximum integral number which does not exceed Y0/Vd. Accordingly, if the number of picture elements of a reduced screen in the horizontal direction is represented by X and the corresponding number of frames by f, then the time code N (frame) is given by $$N=f\times P/X+st \qquad (1)$$

where st is a start time code (frame) representative of a frame of animation image data obtained by sampling of a slit-shaped image at the start coordinates. The time code st is stored into the memory of the host computer 8 when a video index is produced as described hereinabove.

Referring back to FIG. 8, at step 202, a warp pointer 45 is displayed on the display screen 5 corresponding to the mouse point (x, y). Further, the time code N calculated in accordance with the equation (1) above is converted into, for example, minute, second and frame and displayed at a location of the display screen 5 below the "WARP" button (FIG. 7 shows the display screen before the display of the time code N is provided).

Subsequently at step 203, it is judged whether or not the mouse button is turned on while the cursor 44 is positioned at the displayed position of the "WARP" button. When the mouse button is on, a command to warp to the time code N is outputted from the host computer 8. The command is supplied, at step 204, to an animation image data source (one of the video disk apparatus 14A and the video tape recorders 14B1 to 14BN) from which the video signal of the video index displayed on the display screen 5 was outputted.

The animation image data source having received the command to warp to the time code N performs a warping operation to warp to a portion of the time code N and continues operation thereof which was performed before warping. For example, when the operation before warping is a reproducing operation, the reproducing operation is continued after warping to the portion of the time code N. A reproduced image from the animation image data source is thus displayed at the monitoring portion 43 of the display screen 5.

Subsequently at step 205, it is judged whether or not the mouse button is turned on while the cursor 44 is positioned at the displayed position of "REPEAT". When the mouse button is on, the image data processing apparatus enters from a warp mode into a repeat mode at step 206.

Then at step 207, it is judged whether or not the mouse button is turned on while the cursor 44 is positioned at the displayed position of "EDITION". When the mouse button is on, the image data processing apparatus enters from a warp mode into an edition mode at step 208.

Figure 10:
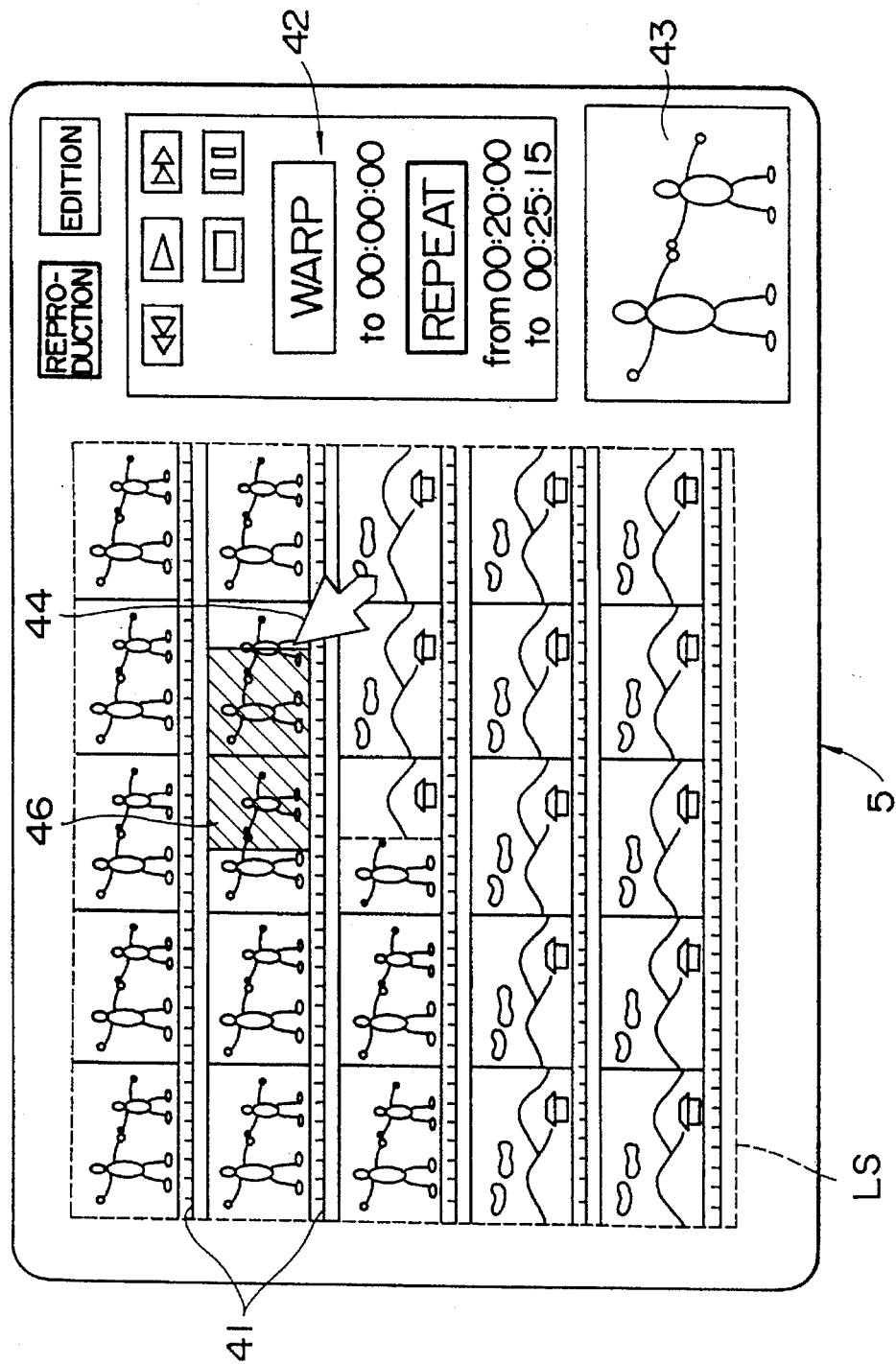
FIG. 10 is an illustration showing an exemplary display screen in a repeat mode of the image data processing apparatus of FIG. 1.
Figure 11:
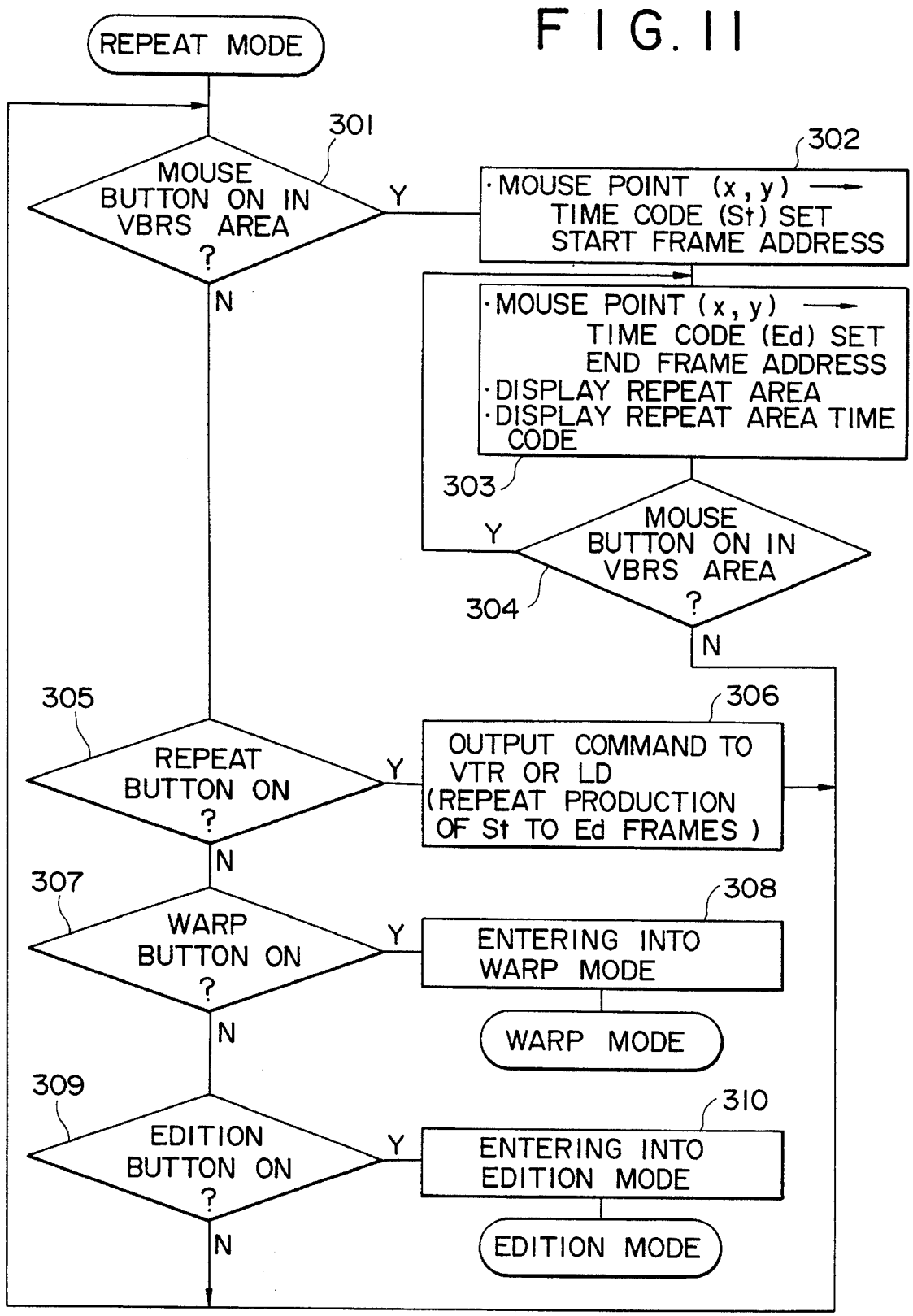
FIG. 11 is a flow chart illustrating operation of the image data processing apparatus of FIG. 1 in a repeat mode.

FIG. 10 shows an exemplary display when the image data processing apparatus is in a repeat mode, and FIG. 11 illustrates operation of the image data processing apparatus when it is in a repeat mode. Referring to FIGS. 10 and 11, at step 301, it is judged whether or not the mouse button is turned on while the cursor 44 is positioned in the VBRS area LS. When the mouse button is on, the mouse point (x, y) is converted into a time code St and a Start frame address is set to the time code St at step 302. Conversion from the mouse point (x, y) into the time code St is calculated in accordance with the equation (1) given hereinabove where N is replaced by St.

Then, while the mouse button is kept in a condition wherein the cursor 44 remains within the VBRS area LS (step 304), the mouse point (x, y) is converted into a time code Ed and an end frame address is set to the time code Ed at step 303. Conversion from the mouse point (x, y) into the time code Ed is calculated in accordance with the equation (1) wherein N is replaced by Ed. At step 303, the repeat area 46 is displayed corresponding to reduced pictures from the start frame to the end frame of the display screen 5. Further, the time codes St and Ed are converted into and displayed in minute, second and frame at a portion of the display screen 5 below the display of "REPEAT".

Subsequently at step 305, it is judged whether or not the mouse button is turned on while the cursor 44 is positioned at the displayed position of "REPEAT". When the mouse button is on, a command to repeat from the time code St to the time code Ed is outputted from the host computer 8. The command is supplied, at step 306, to an animation image data source (one of the video disk apparatus 14A and the video tape recorders 14B1 to 14BN) which outputted a video signal regarding the video index displayed on the display screen 5.

The animation image data source having received the command to repeat from the time code St to the time code Ed performs repetitive reproduction at a portion from the time code St to the time code Ed. Then, the reproduced image is displayed at the monitoring portion 43 of the display screen 5.

Then at step 907, it is judged whether or not the mouse button is turned on while the cursor 44 is positioned at the displayed position of "WARP". When the mouse button is on, the image data processing apparatus enters from a repeat mode into a warp mode at step 308.

Subsequently at step 309, it is judged whether or not the mouse button is turned on while the cursor 44 is positioned at the displayed position of "EDITION". When the mouse button is on, the image data processing apparatus enters from a warp mode into an edition mode at step 310.

Figure 12:
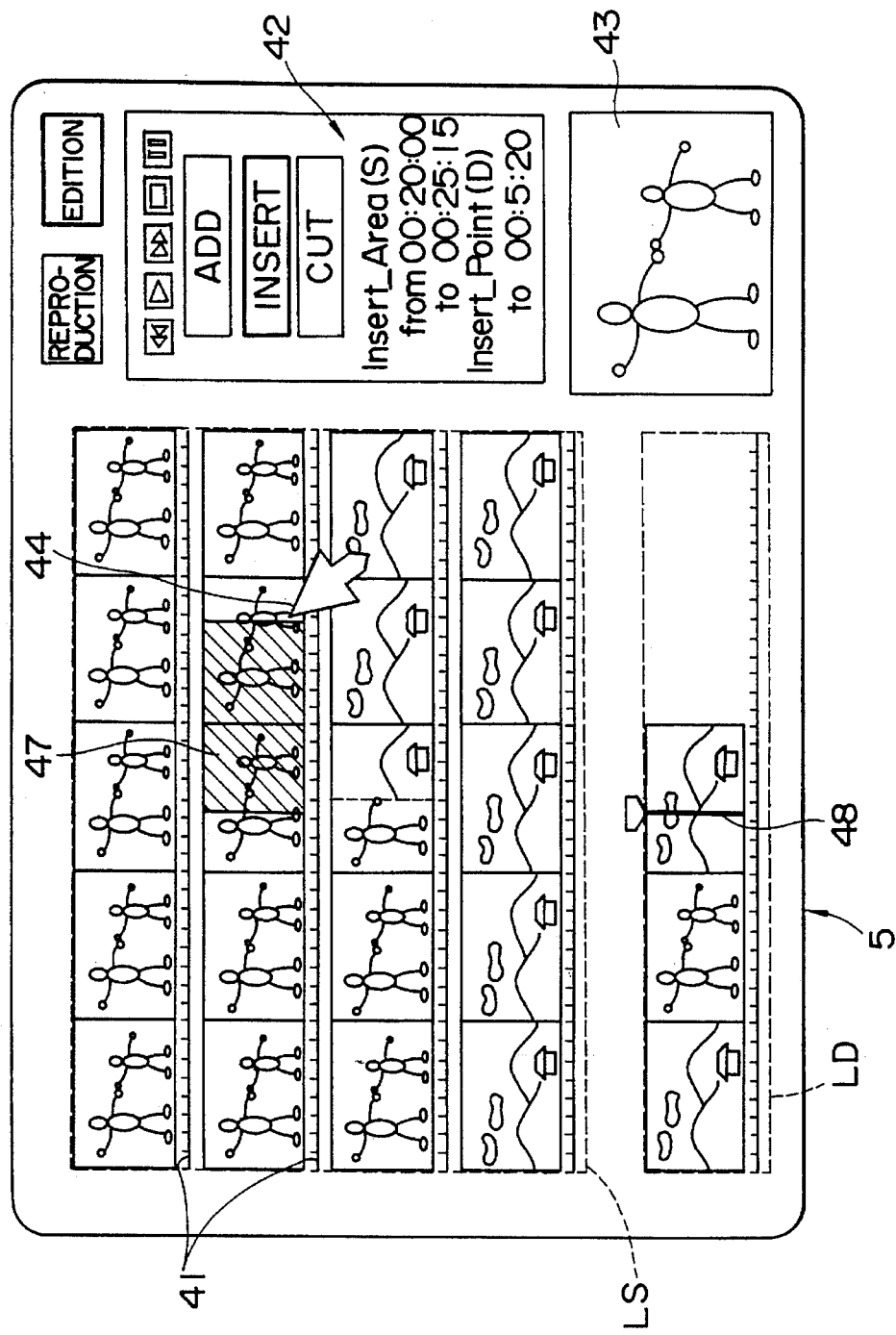
FIG. 12 is an illustration showing an exemplary display screen in an insert mode of the image data processing apparatus of FIG. 1.
Figure 13:
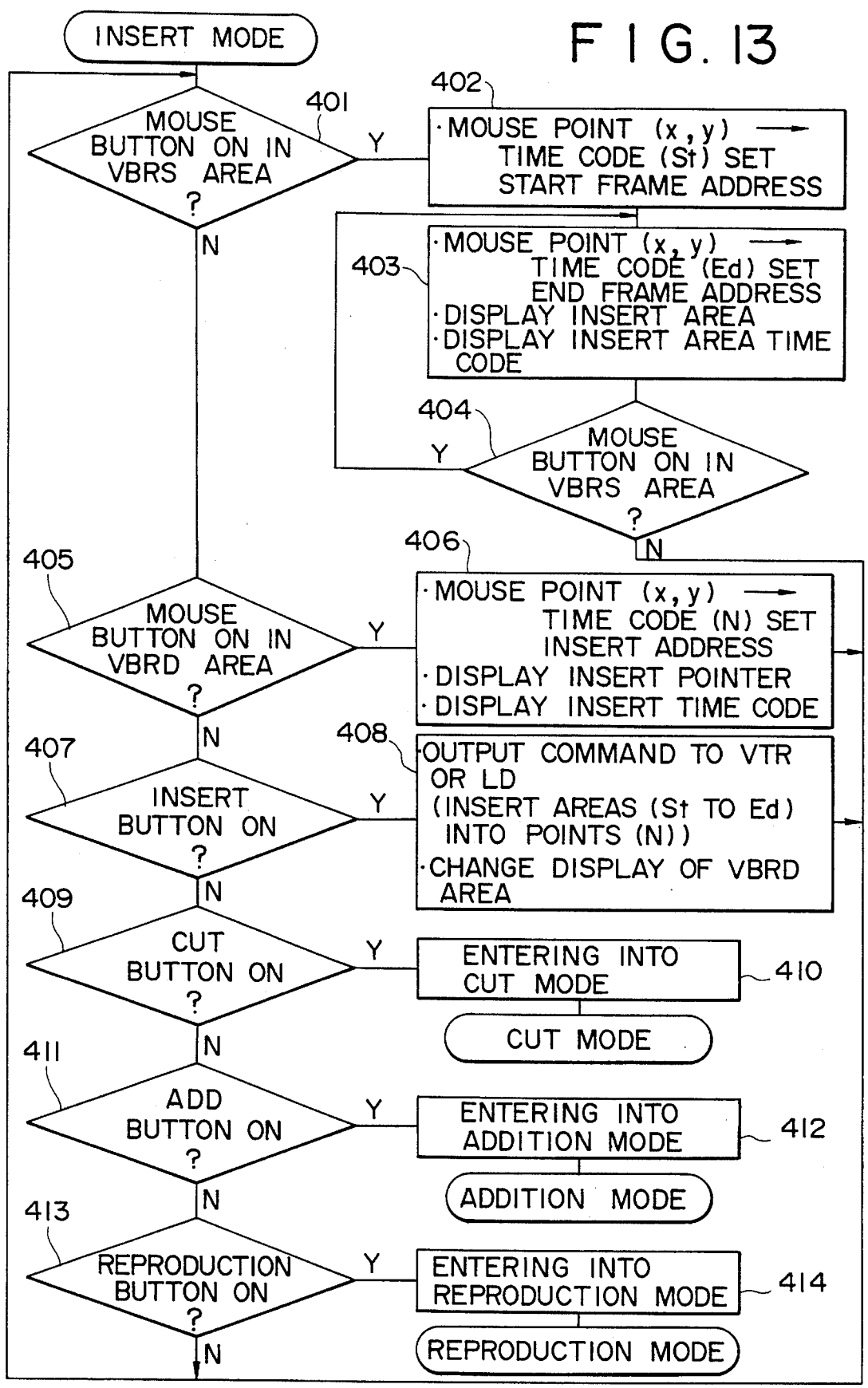
FIG. 13 is a flow chart illustrating operation of the image data processing apparatus of FIG. 1 in an insert mode.

FIG. 12 shows an exemplary display when the image data processing apparatus is in an edition mode and besides in an insert mode. In an edition mode, a VBFD area in which a video index on the destination side indicating a result of edition is displayed is provided together with the VBRS area in which a video index on the source side is displayed. FIG. 13 illustrates operation of the image data processing apparatus in an insert mode.

Referring to FIG. 13, at step 401, it is judged whether or not the mouse button is turned on while the cursor 44 is positioned within the VBRS area LS. When the mouse button is on, the mouse point (x, y) is converted into a time code St and a start frame address is set to the time code St at step 402. Conversion of the mouse point (x, y) into the time code St is calculated in accordance with the equation (1) given hereinabove where N is replaced by St.

Then, while the mouse button is kept on in a condition wherein the cursor 44 is positioned within the VBRS area LS (step 404), the mouse point (x, y) is converted into a time code Ed and an end frame address is set to the time code Ed at step 403. Conversion of the mouse point (x, y) into the time code Ed is calculated in accordance with the equation (1) where N is replaced by Ed.

At step 403, an insert area 47 is displayed at a portion of the display screen 5 corresponding to reduced screens from the start frame to the end frame. Further, The time codes St and Ed are converted into and displayed in minute, second and frame at a portion of the display screen 5 below the display of "Insert Area (S)".

Further, at step 405, it is judged whether or not the mouse button is turned on while the cursor 44 is positioned within a VBRD area LD. When the mouse button is on, the mouse point (x, y) is converted into a time code N and an insert address is set to the time code N at step 406. The time code N is calculated in accordance with the equation (1).

At step 406, an insert pointer 48 is displayed on the display screen 5 corresponding to the mouse point (x, y). Further, the time code N is converted into and displayed in minute, second and frame at a portion of the display screen 5 below the display of "Insert Point (D)". Subsequently at step 407, it is judged whether or not the mouse button is turned on while the cursor 44 is positioned at the displayed position of "INSERT". When the mouse button is on, a command to insert the time codes St to Ed on the source side to the time code N on the destination side is outputted from the host computer 8 at step 408. In response to the command, an inserting operation is performed between animation image data sources (those of the video disk apparatus 14A and the video tape recorders 14B1 to 14BN) on the source side and the destination side. Further, at step 408, the display of the VBRD area LD is changed (FIG. 12 shows the display before such change). In short, the insert area 47 is inserted into the position of the insert pointer 48.

Then at step 409, it is judged whether or not the mouse button is turned on while the cursor 44 is positioned at the displayed position of "CUT". When the mouse button is on, the image data processing apparatus enters from an insert mode into a cut mode at step 410.

Subsequently at step 411, it is judged whether or not the mouse button is turned on while the cursor is positioned at the displayed position of "ADD". When the mouse button is on, the image data processing apparatus enters from an insert mode into an addition mode at step 412.

Then at step 413, it is judged whether the mouse button is turned on while the cursor 44 is positioned at the displayed position of "REPRODUCTION". When the mouse button is on, the image data processing apparatus enters from an insert mode into a reproduction mode at step 414.

It is to be noted that, in a cut mode in an edition mode, a cut area is designated in the VBRD area LD and the designated area is cut. On the other hand, in an addition mode in an edition mode, an area to be added is designated in the VBRS area LS and the designated area is added to the VBRD area LD.

In this manner, in the image data processing apparatus of the present embodiment, when the cursor 44 is moved to indicate a predetermined point or a predetermined area while a video index is displayed on the display screen 5, a time code corresponding to the point or the area is calculated, and various operations in reproduction (retrieval) and edition are executed using the time code. Consequently, accurate retrieving and editing operations in the unit of frames can be performed by intuitive operation on the video index.

Figure 14:
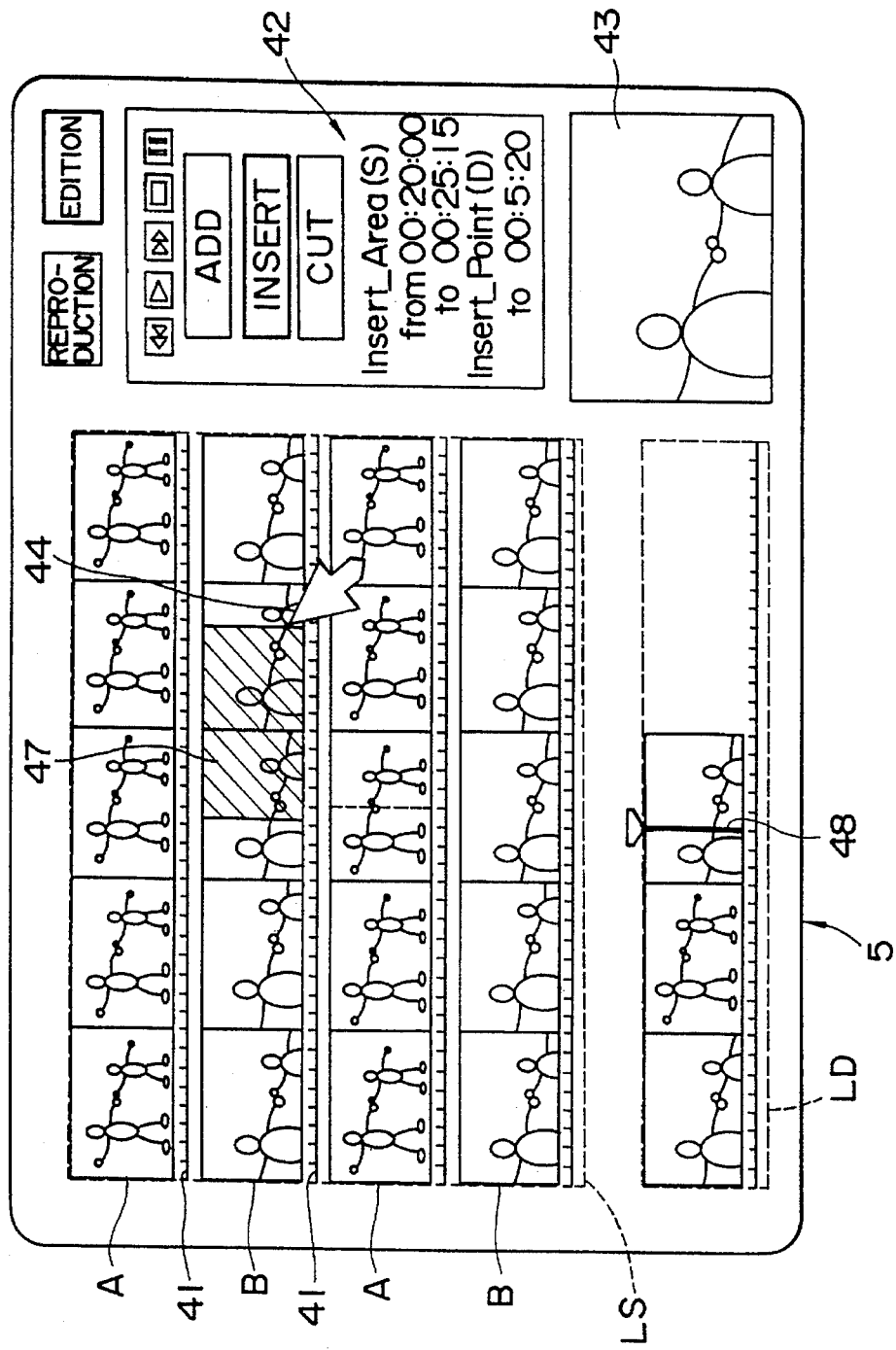
FIG. 14 is an illustration showing an exemplary display screen on the source side in an insert mode of the image data processing apparatus of FIG. 1.

It is to be noted that, though not described above, a plurality of sources may be designated. In this instance, video indices relating them are displayed in a juxtaposed relationship In the VBRS area LS of the display screen 5. Accordingly, in an edition mode, an editing operation can be performed while grasping an entire image of an event photographed by a plurality of cameras. FIG. 14 illustrates an exemplary display of the display screen 5 in an edition mode when two sources are designated. In FIG. 14, reference character A denotes a video index of one of the two sources while reference B denotes a video index of the other source.

Figure 15:
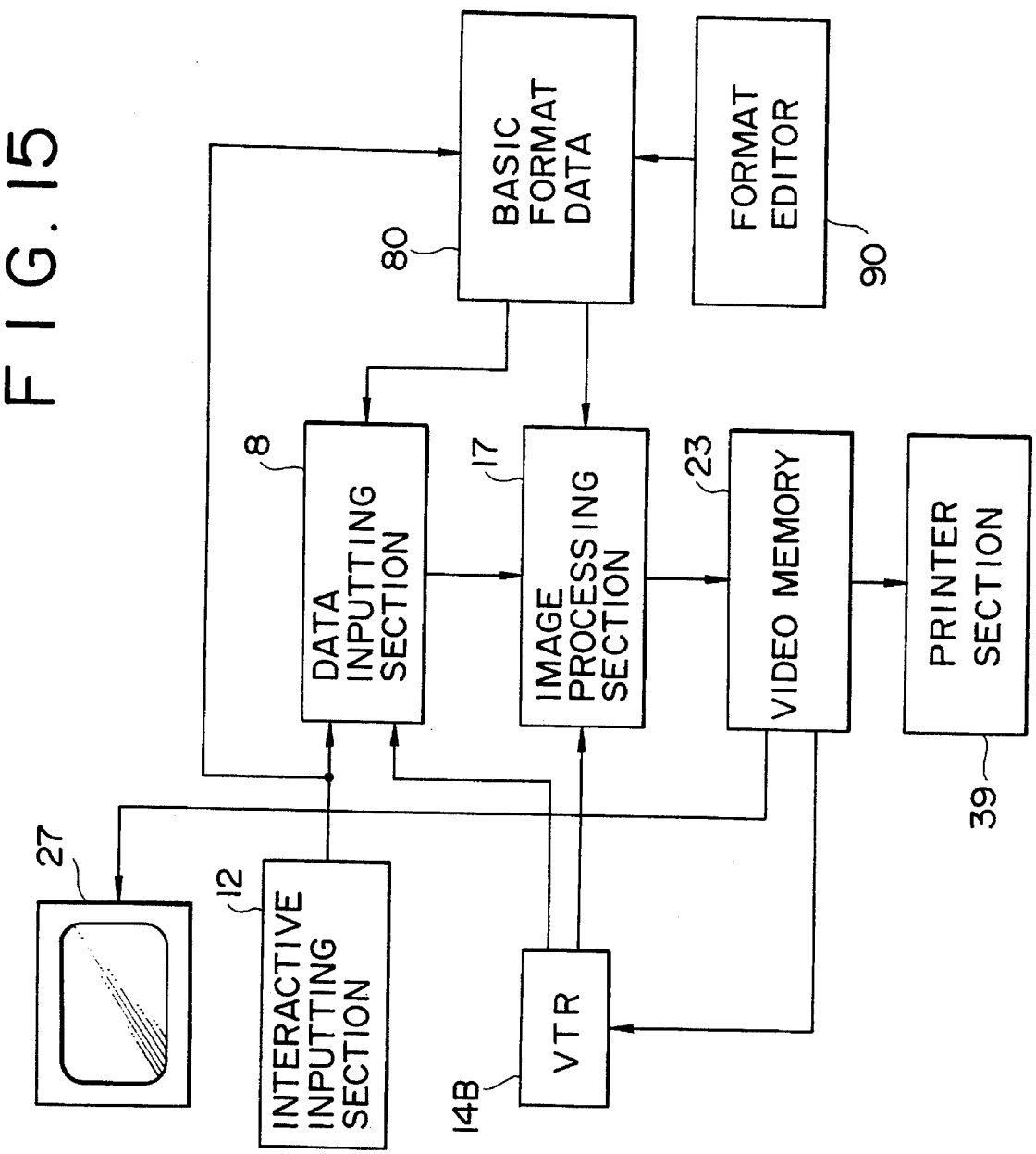
FIG. 15 is a block diagram of another image data processing apparatus showing a second preferred embodiment of the present invention.

Referring now to FIG. 15, there is shown an outline of another image data processing apparatus according to a second preferred embodiment of the present invention. The image data processing apparatus shown includes a memory 80 for storing therein basic format data for an index of a video tape. The memory 80 is constituted from a non-volatile memory, and edition and production of a basic format can be performed from basic format data from the memory 80 by a format editor 90. Upon production of an index, one of the basic formats is selected by operation of an interactive inputting section 12 represented by a keyboard.

A data inputting section 8 is provided to input therethrough tape information (a time code and so forth) from a video tape recorder 14B or necessary data from the interactive inputting section 12 in accordance with data of the selected basic format. It is to be noted that the interactive inputting section 12 and so forth correspond to the keyboard 12 shown in FIG. 1, and in FIG. 15, like elements are denoted by like reference characters to those of FIG. 1 and overlapping description thereof is omitted herein.

An image processing section 17 produces a video index or a reduced sample scene from a reproduced video signal from the video tape recorder 14B, produces an audio index from a reproduced audio signal from the video tape recorder 14B, lays out the video index and/or the reduced sample scene and the audio index thus produced together with text information from the data inputting section 8 and so forth and writes them as an index into a video memory 23 in accordance with data of the selected basic format.

It is to be noted that, while the image processor 17 and the audio processor 30 are shown separated from each other in FIG. 1, only the image processor 17 is shown representing them in FIG. 15.

The video memory 23 provides a working area in which a video index is developed. A video index produced in the video memory 23 is supplied as a video signal to the video tape recorder 14B, the printer section 39 and the display unit 27.

FIGS. 16 to 19 show exemplary different basic formats.

Figure 16:
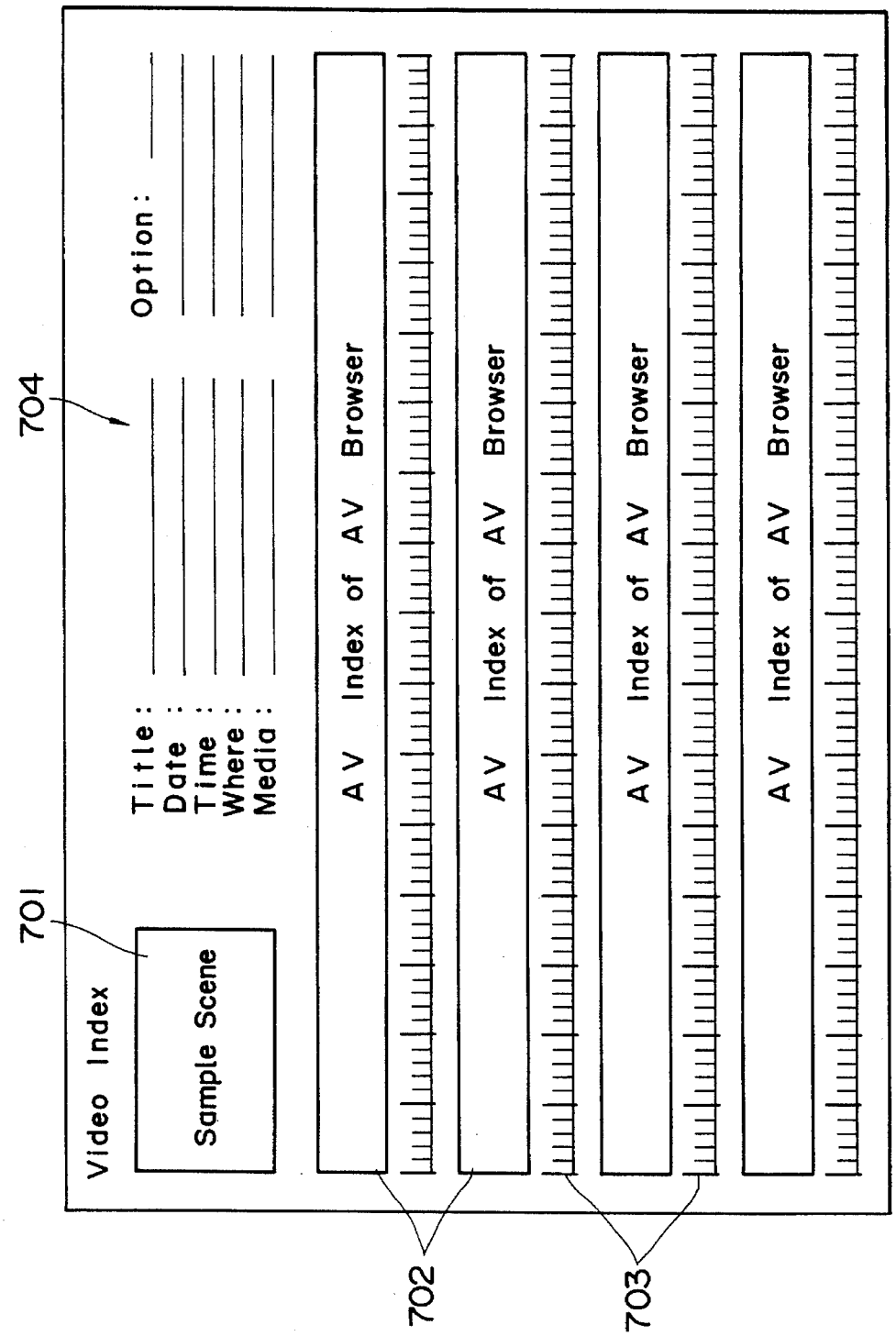
FIGS. 16 to 19 are diagrammatic representations showing different basic formats for an index employed in the image data processing apparatus of FIG. 15.

Referring first to FIG. 16, a reduced sample scene is inserted into a portion of "Sample Scene". The reduced sample scene in this instance is a reduced image of the image of a predetermined frame of a reproduced video signal.

A video index and an audio index are inserted into each of portions 702 of "AV Index of AV Browser". Details of such indices will be hereinafter described. A scale 703 indicating the lapse of time is disposed below each of the portions 702 of "AV Index of AV Browser".

In addition, various items 704 such as "Title" and so forth are disposed at the top. Thus, a title is inserted into a portion of "Title"; a date (year, month, day) is inserted into a portion of "Date"; time is inserted into a portion of "Time"; a photographing location is inserted into a portion of "Where"; a specification of, for example, the video tape recorder 14B is inserted into a portion of "Media"; and a memorandum is inserted into a portion of "Option".

Figure 17:
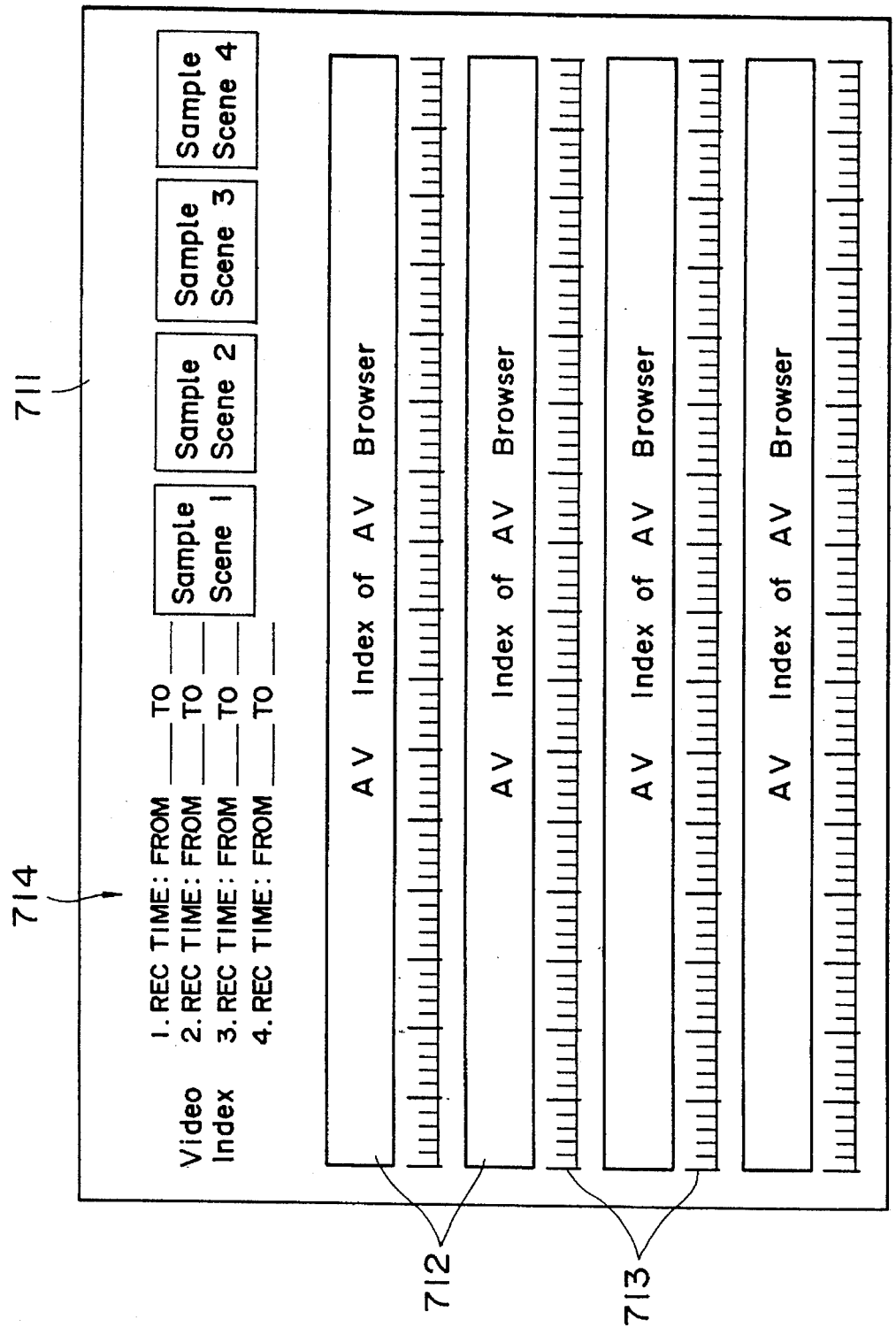

FIG. 17 shows another basic format which is suitably used to produce an index of a video tape recorded, for example, with a video tape recorder integrated with a camera. In such a video tape, a time of starting of recording and a change of scene correspond to each other. It is to be noted that it is necessary for a signal representative of a time of starting of recording to be recorded on a video tape so that the time of starting of recording can be identified upon reproduction of the video tape.

Referring to FIG. 17, reduced sample scenes are individually inserted into portions 711 of "Sample Scene 1" to "Sample Scene 4". Each of the reduced sample scenes in this instance a reduced image of the image of a frame corresponding to a time of each starting of recording of a reproduced video signal.

A video index and an audio index are inserted into each of portions 712 of "AV Index of AV Browser". A scale 713 indicative of the passage of time is disposed below each of the portions 712 of "AV Index of AV Browser".

In addition, items 714 of "REC TIME" are disposed. Time codes (times of starting and stopping of recording) of reduced sample scenes inserted in the portions 711 of "Sample Scene 1" to "Sample Scene 4" are inserted into the portions 714 of "REC TIME".

Figure 18:
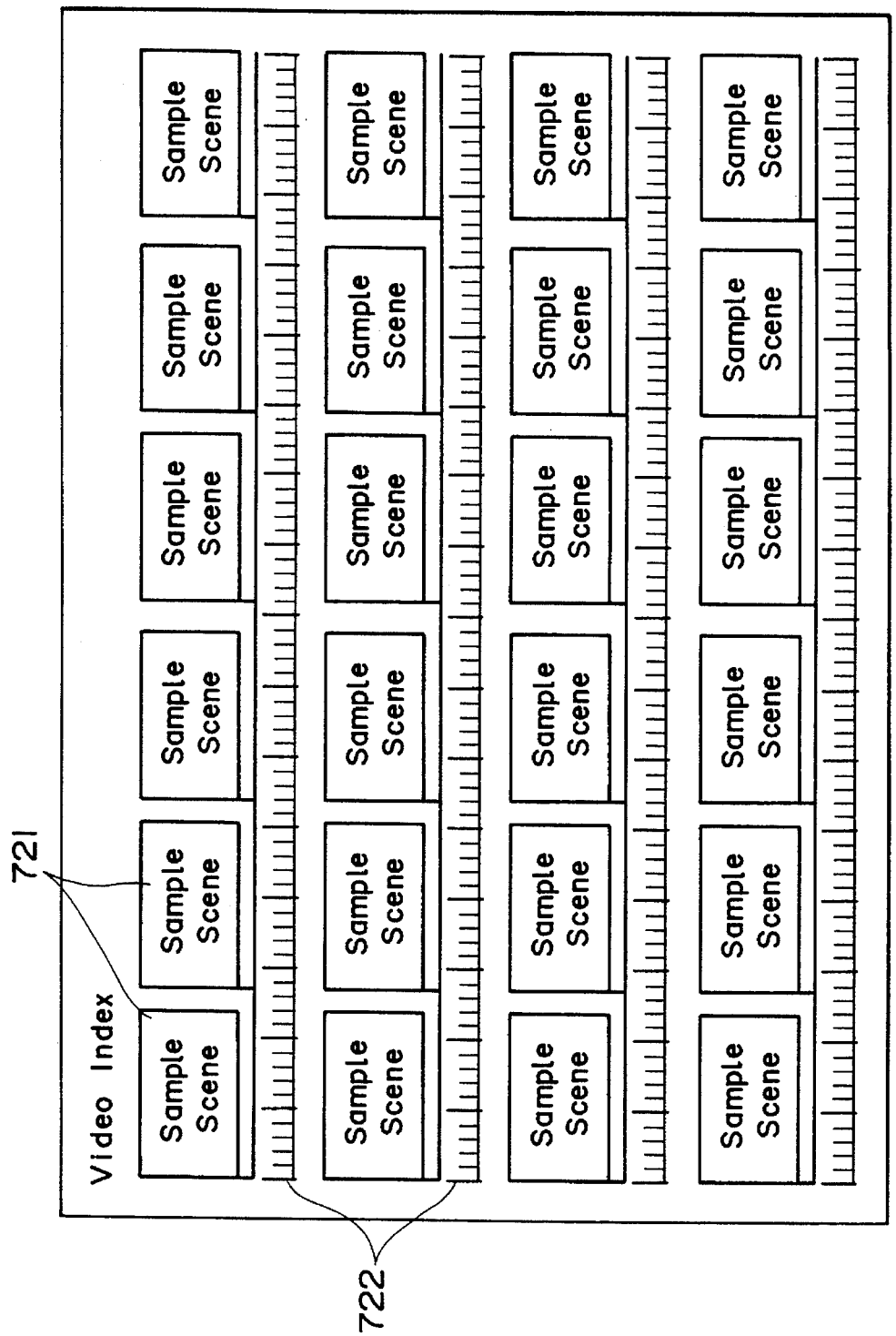

Referring now to FIG. 18, a reduced sample scene is inserted into each of a plurality of portions 721 of "Sample Scene" The reduced sample scenes in this instance are reduced images of the images of a reproduced video signal after each predetermined interval of time. A scale 722 indicative of the lapse of time is disposed below each horizontal row of the portions 721 of "Sample Scene".

Figure 19:
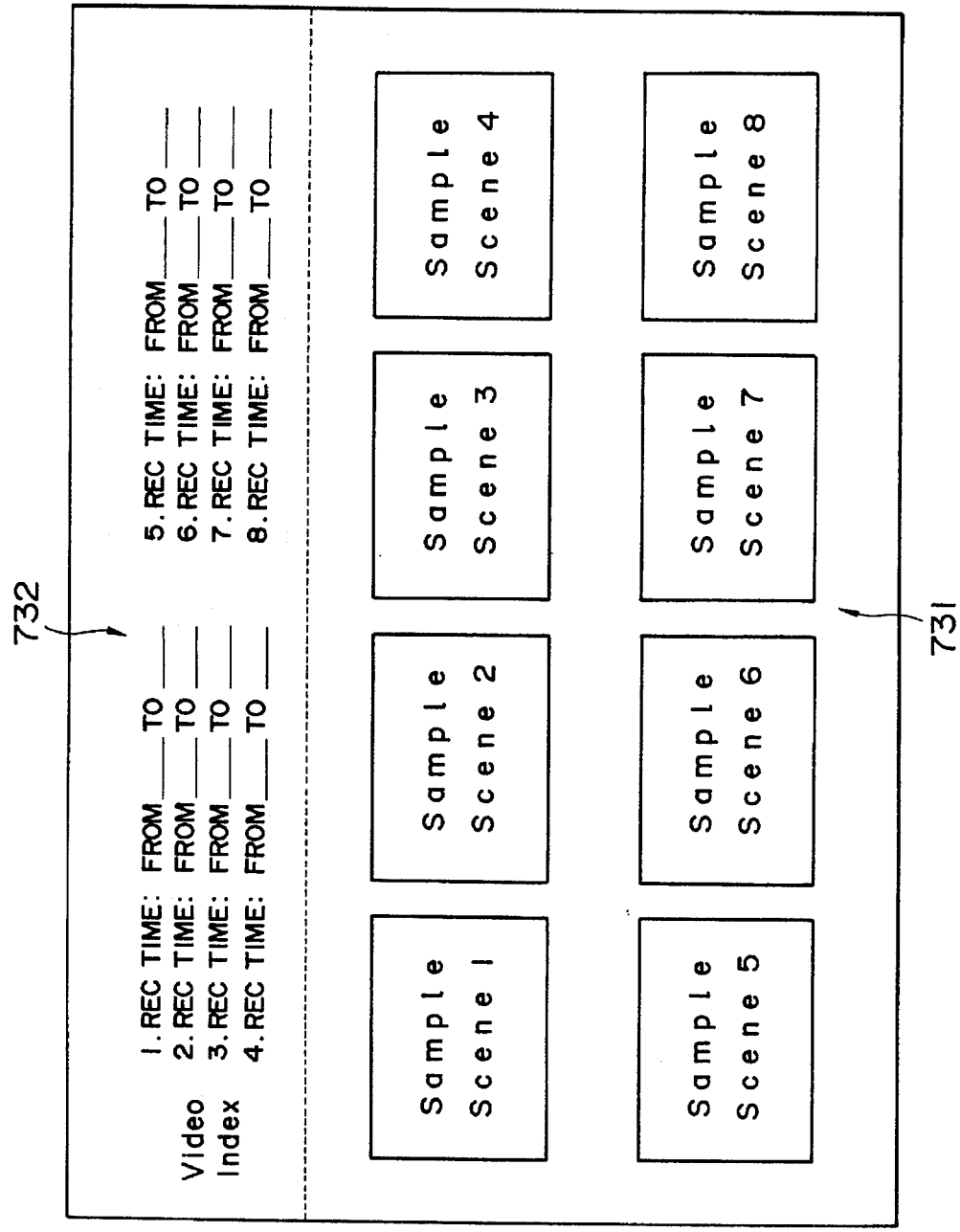

Also a still further basic format shown in FIG. 19 is suitably used to produce an index of a video tape recorded, for example, with a video tape recorder integrated with a camera. Referring to FIG. 19, reduced sample scenes are inserted into portions 731 of "Sample Scene 1" to "Sample Scene 8". Each of the reduced sample scenes in this instance is a reduced image of the image of a frame corresponding to the time of each starting of recording of a reproduced video signal.

In addition, items 732 of "REC TIME" are disposed. Time codes of reduced sample scenes inserted in the portions 731 of "Sample Scene 1" to "Sample Scene 8" are inserted into the portions 732.

FIGS. 20 to 23 show operations upon production of an index when the basic forms of FIGS. 16 to 19 are selected, respectively.

Figure 20:
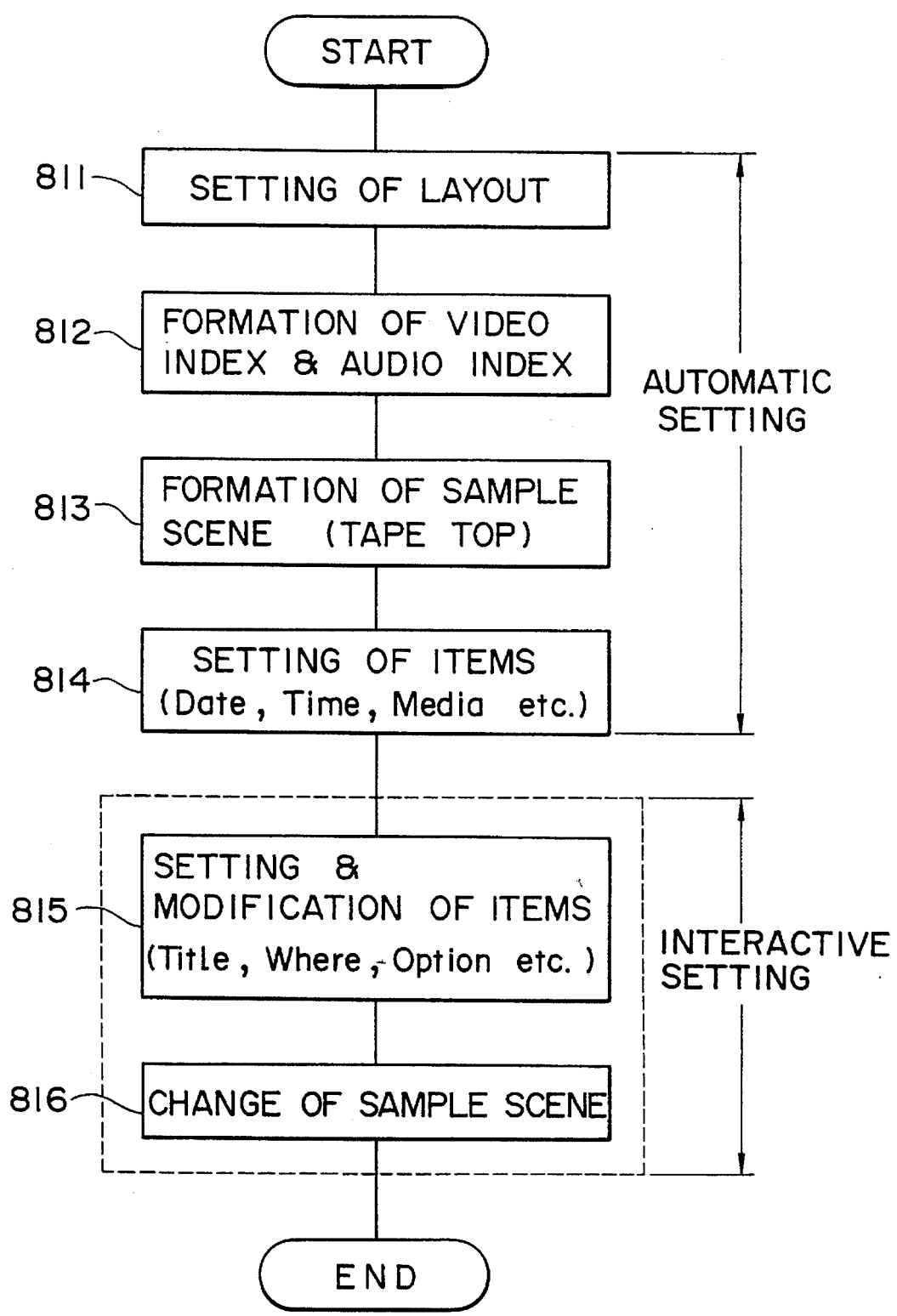
FIGS. 20 to 23 are flow charts illustrating different flows of operation for production of indices of different formats.

Referring first to FIGS. 15, 16 and 20, first at step 811, a layout of the scales 703, the items of "Title" to "Option" and so forth is set in accordance with data of the selected basic format. In this instance, data of the scales 703 and the items of "Title" and so forth are written into corresponding addresses of the video memory 23.

Subsequently, a reproduced video signal and a reproduced audio signal are supplied from the video tape recorder 14B to the image processing section 17, at which a video index and an audio index are formed at step 812. Then, data of the indices are written into a portion of the video memory 23 corresponding to one of the portions 702 of "AV Index of AV Browser".

Then at step 813, a reduced sample scene is formed from a reproduced video signal of the video tape recorder 14B by the image processing section 17. The reduced sample scene is formed from a reproduced video signal at the top of the video tape. Then, data of the reduced sample scene are written into a portion of the video memory 23 corresponding to the portion 701 of "Sample Scene".

Then at step 814, items of "Date", "Time", "Media" and so forth are set. In this instance, data of the items are written into corresponding addresses of the video memory 23. The processing so far takes place automatically.

Subsequently, setting or correction of items of "Title", "Time", "Media" and so forth is performed at step 815. Thereupon, data of the items are written into corresponding addresses of the video memory 23. In this instance, an index screen is displayed on the screen of the display unit 27, and an item to be set or corrected is indicated by a cursor by operation of, for example, a mouse of the interactive inputting section 12 so that setting or correction is performed in the interactive form with the operator.

Then, in case the reduced sample scene formed at step 813 is not satisfactory, modification to the sample scene is performed at step 816. In this instance, by indicating a predetermined point of the video index on the index screen of the display unit 27 by means of the cursor, the display is changed to a reduced sample scene of a frame image corresponding to the point. In short, a time code corresponding to the point indicated by the cursor is obtained and a frame image of the time code is reproduced from the video tape recorder 14B and a reduced sample scene is formed from the frame image by the image processing section 17, whereafter data of the reduced sample scene are written into the video memory 23.

Figure 21:
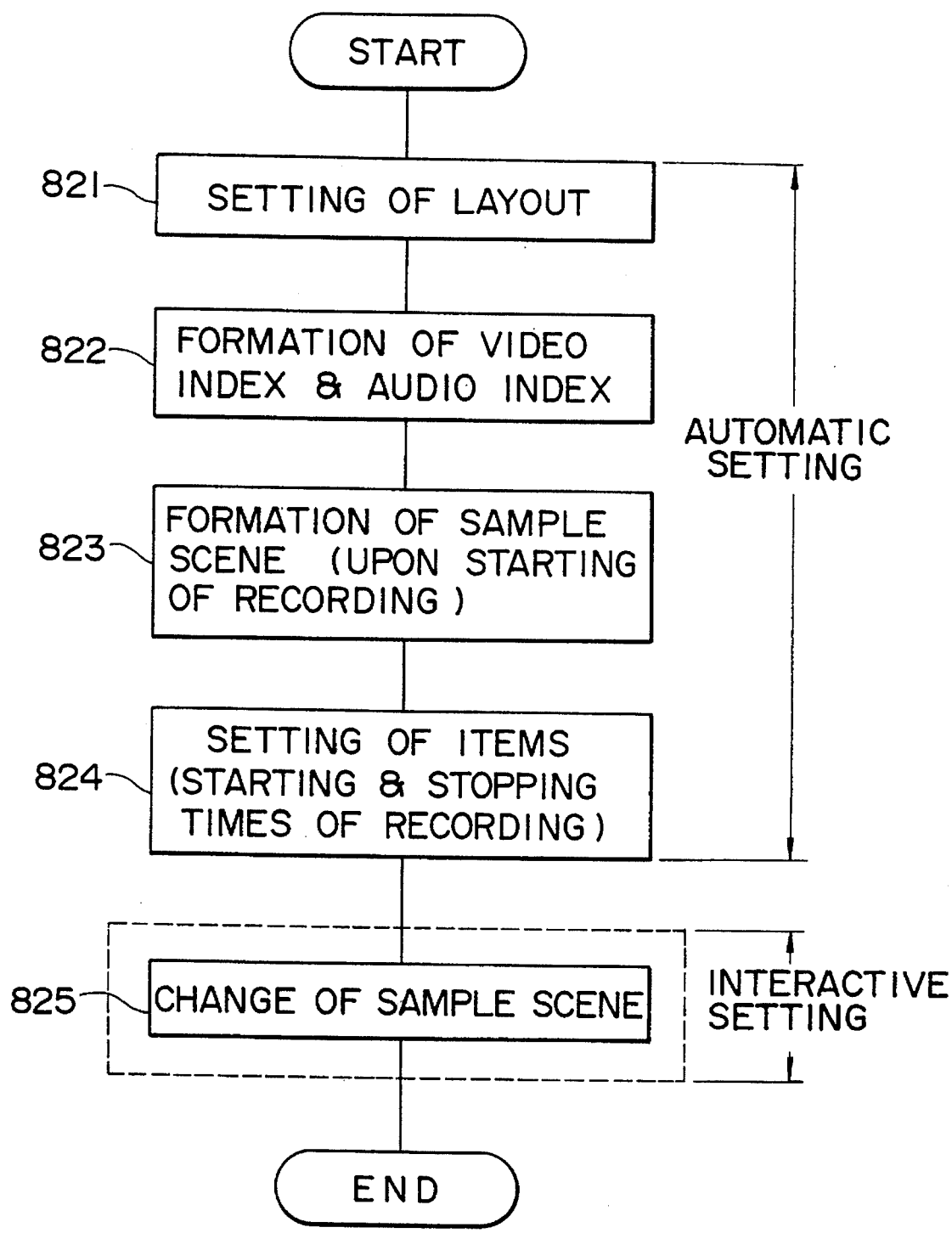

Referring now to FIGS. 15, 17 and 21, first at step 821, a layout of the scales 713, the items of "REC TIME" and so forth is set in accordance with data the selected basic format. In this instance, data of the scales 713 and the items of "REC TIME" and so forth are written into corresponding addresses of the video memory 23.

Subsequently, a reproduced video signal and a reproduced audio signal are supplied from the video tape recorder 14B to the image processing section 17, at which a video index and an audio index are formed at step 822. Then, data of the indices are written into a portion of the video memory 23 corresponding to one of the portions 712 of "AV Index of AV Browser".

Then at step 823, a reduced sample scene is formed from a reproduced video signal of the video tape recorder 14B by the image processing section 17. The reduced sample scene is formed from a reproduced video signal at the time of each starting of recording. Then, each time the time of starting of recording exists, data of a reduced sample scene are written into a portion of the video memory 23 corresponding to one of the portions 711 of "Sample Scene 1" to "Sample Scene 4".

Then at step 824, an item of "REC TIME" is set. In particular, time codes of the times of starting and stopping of recording corresponding to the reduced sample scene to be inserted into the one of the portions 711 of "Sample Scene 1" to "Sample Scene 4" are set. In this instance, data of the time codes are written into an address of the video memory 23. The processing so far takes place automatically.

Subsequently, in case the reduced sample scene formed at step 823 is not satisfactory, modification to the sample scene is performed at step 825. In this instance, by indicating a predetermined point of the video index on the index screen of the display unit 27 by means of the cursor, the display is changed to a reduced sample scene of a frame image corresponding to the point. In short, a time code corresponding to the point indicated by the cursor is obtained and a frame image of the time code is reproduced from the video tape recorder 14B and a reduced sample scene is formed from the frame image by the image processing section 17, whereafter data of the reduced sample scene are written into the video memory 23.

Figure 22:
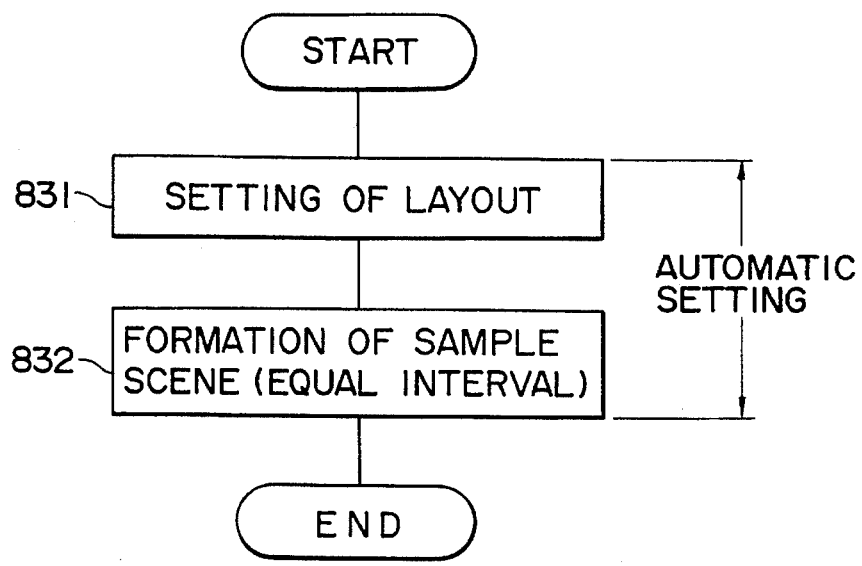

Referring now to FIGS. 15, 17 and 22, first at step 831, a layout of the scales 722, the items of "Sample Scene" and so forth is set in accordance with data of the selected basic format. In this instance, data of the scales 722 are written into corresponding addresses of the video memory 207. Then at step 832, reduced sample scenes are formed from a reproduced video signal of the video tape recorder 14B by the image processing section 17. The reduced sample scenes are successively formed from a reproduced video signal after each predetermined interval of time. Then, each time a reduced sample scene is formed, data of the reduced sample scene are successively written into a portion of the video memory 23 at an address corresponding to one of the portions 721 of "Sample Scene". In the flow of operations illustrated in FIG. 22, all of the processing takes place automatically.

Figure 23:
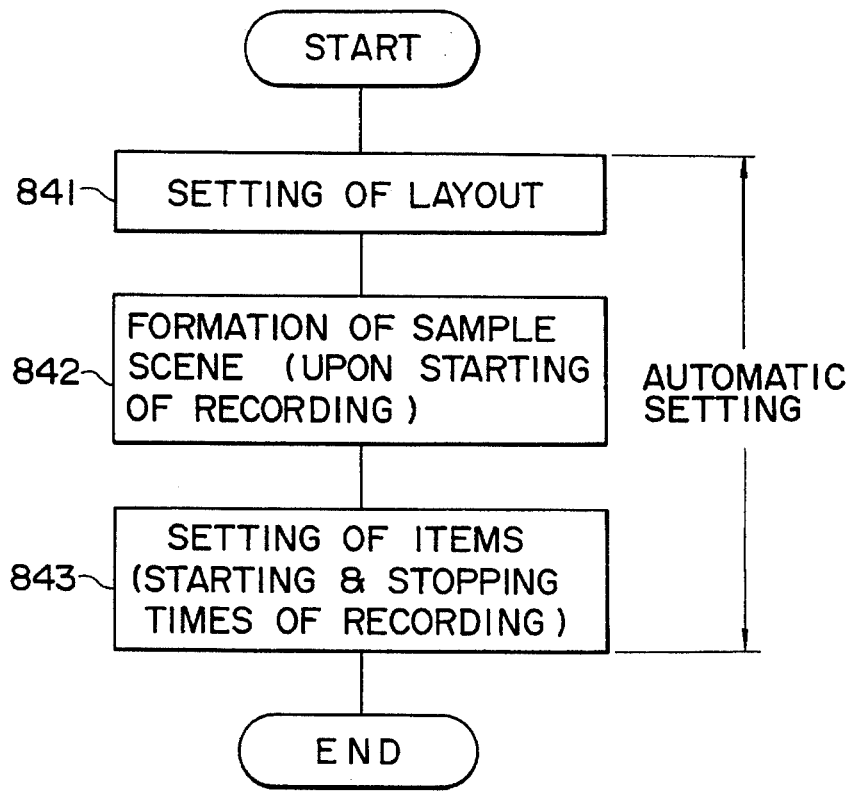
Figure 24:
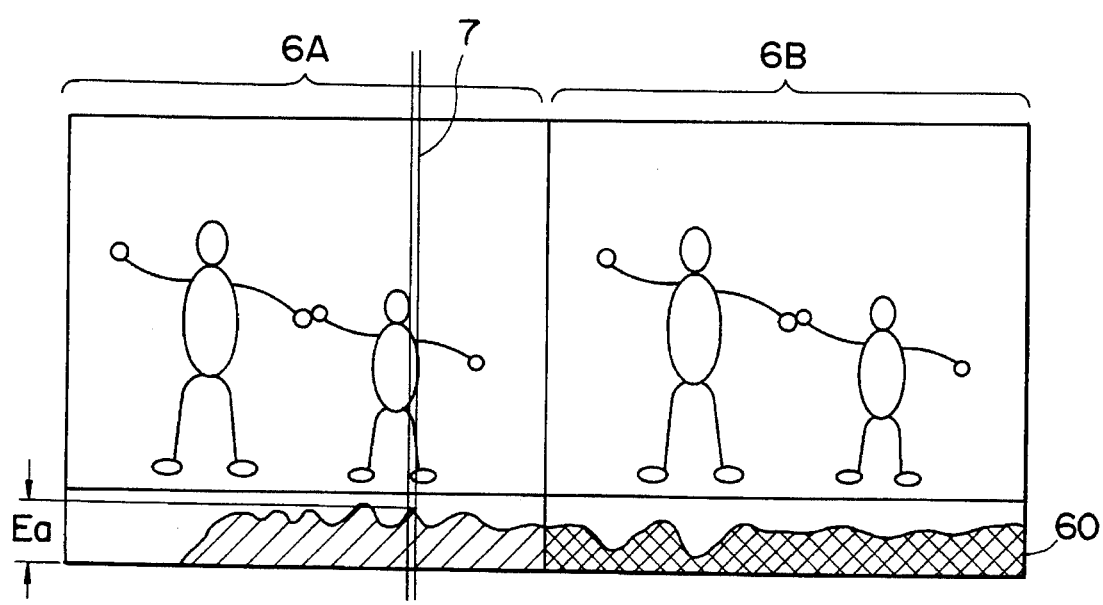
FIG. 24 is a diagrammatic view showing a sound displaying portion in an enlarged scale.

Referring now to FIGS. 15, 17 and 23, first at step 841, a layout of sample scenes, the items of "REC TIME" and so forth is set in accordance with data of the selected basic format. In this instance, data of the items of "REC TIME" are written into corresponding addresses of the video memory 23. Subsequently, a reduced sample scene is formed from a reproduced video signal of the video tape recorder 14B by the image processing section 17 at step 842. The reduced sample scene is formed from a reproduced video signal at the time of each starting of recording. Then, each time the time of starting of recording exists, data of a reduced sample scene are successively written into a portion of the video memory 23 corresponding to one of the portions 731 of "Sample Scene 1" to "Sample Scene 8".

Then at step 843, an item of "REC TIME" is set. In particular, data of time codes of the times of starting and stopping of recording corresponding to the reduced sample scene to be inserted into the one of the portions 731 of "Sample Scene 1" to "Sample Scene 8" are set. In this instance, data of the time codes are written into an address of the video memory 23. In the flow of operations illustrated in FIG. 23, all of the processing takes place automatically.

A video index produced in such a manner as described above is a reduced screen wherein image data obtained by sampling changing the position of the vertical slit 4 for n frames of the video image set 1 are compressed and joined together, and an outline of animation image data of the video image set 1 can be confirmed from the video index in a corresponding relationship to the lapse of time.

Here, in order to change the position of the vertical slit 4 such that it is scanned in 12 seconds from the left end to the right end of one screen, when, for example, N reduced images 6A, 6B, ... are to be formed in the display screen 5, since $$12 \times N = 12N \text{ (seconds)}$$

$$30 \times 12 \times N = 360N \text{ (frames)}$$

animation image data of a video signal for 12N seconds (360N frames) are displayed in a compressed condition for one frame in the display screen 5. Accordingly, a series of animation image data are compressed at a very high compression ratio.

In this instance, when the animation image of the video image set 1 changes moderately with reference to 12 seconds, since the vertical slit 4 is scanned from the left end to the right end, a condition of an almost original picture of the animation image can be restored. On the other hand, if the animation image of the video image set 1 changes rapidly, for example, like a commercial, then an intermittent line which varies intermittently is formed on some of the reduced screens. Accordingly, while animation image data are displayed in a compressed condition at a very high compression ratio of almost $1/360N$, an outline of a portion at which a moderate change is involved can be confirmed while another portion in which a sudden change is involved can be confirmed as an intermittent line.

Meanwhile, an audio index is a display of a sound level at the audio displaying portion 60 corresponding to a slit image constituting to each reduced screen. In short, the sound level is displayed in accordance with the lapse of time. Further, a color corresponding to a kind of sound is applied to the display of the audio level for each reduced screen. Accordingly, a general flow of sound can be grasped readily together with an image.

It is to be noted that image data may be sampled from individual frames 2 of the video image set 1 using a horizontal slit in place of the vertical slit 4. In this instance, the horizontal slit is periodically scanned at a predetermined speed in a vertical direction (V direction) from the top end to the bottom end of the frame 2. In this instance, the audio display portion 60 may be provided at the left or right side portion of the reduced screens. Further, a kind of sound may be represented not by a different color but by a different magnitude or a different brightness of the display area.

Meanwhile, it is described in connection with FIGS. 20 and 21 hereinabove that, when a sample scene is changed by interactive setting, a predetermined point on a video index is indicated by a cursor and the display is changed to a reduced sample scene of a frame image corresponding to the point. In this instance, a time code of the point indicated by the cursor is obtained, and the video tape recorder 14 is controlled so that it may reproduce the time code (frame) portion and the image processor 17 forms a reduced sample scene from a frame image reproduced by the video tape recorder 14.

It is to be noted that, while an index of a magnetic tape is produced in the embodiments described above, an index of any other image record medium can be produced in a similar manner.

Having now fully described the invention, it will be apparent to one of ordinary skill in the art that many changes and modifications can be made thereto without departing from the spirit and scope of the invention as set forth herein.

What is claimed is:

1. An image data processing apparatus, comprising:

an animation image generating source for supplying data representing a series of frames of animation images to be displayed spatially in two dimensions;

sample data producing means for sampling along one direction the animation image data of successive frames received from said animation image generating source while successively moving a sampling position in another direction and producing image data representing a still composite image derived from a plurality of frames of the thus sampled animation image data;

displaying means having a display screen for displaying thereon simultaneously a group of still composite images each derived from a plurality of frames of the still image data received from said sample data producing means;

point designating means for designating a predetermined point of the still images displayed on said display means; and time code converting means for producing a time code corresponding to the predetermined point designated by said point designating means.

2. An image data processing apparatus according to claim 1, further comprising warp mode designating means for designating a warp mode, and wherein when said warp mode designating means designates a warp mode, said animation image generating source generates an image at a time code that corresponds to a point designated by said point designating means.

3. An image data processing apparatus according to claim 1, wherein the time code is displayed as a numerical value on the display screen of said displaying means.

4. An image data processing apparatus according to claim 3, wherein the display screen of said displaying means has a first portion for displaying said group of still images and a monitoring portion on which the animation image data of one image are displayed.

5. An image data processing apparatus according to claim 1, further comprising means for successively detecting audio data corresponding to the animation image data to be displayed in two dimensions, means for converting the detected audio data into video data for visual display, and means for causing the video data to be displayed on said display means.

6. An image data processing apparatus according to claim 5, wherein the video data displayed on said displaying means contain chrominance data of a color selected to correspond to a selected characteristic of the audio data.

7. An image data processing apparatus, comprising:

an animation image generating source for supplying data representing a series of frames of animation images to be displayed spatially in two dimensions;

sample data producing means for sampling one along direction the animation image data of successive frames received from said animation image generating source while successively moving a sampling position in another direction and producing image data representing a still composite image derived from a plurality of frames of the thus sampled animation image data;

displaying means having a display screen for displaying thereon a group of still composite images each derived from a plurality of frames of the still image data received from said sample data producing means;

area designating means for designating a predetermined area of the still images displayed on said display means; and time code converting means for producing a time code corresponding to the predetermined area designated by said area designating means.

8. An image data processing apparatus according to claim 7, further comprising repeat mode designating means for designating a repeat mode, wherein when said repeat mode designating means designates a repeat mode said animation image generating source generates a same image for all points between time codes corresponding to areas designated by said area designating means.

9. An image data processing apparatus according to claim 7, wherein the time code is displayed as a numerical value on the display screen of said displaying means.

10. An image data processing apparatus according to claim 9, wherein the display screen of said displaying means has a first portion for displaying said group of images and a monitoring portion on which the animation image data of one image are displayed.

11. An image data processing apparatus according to claim 7, further comprising means for successively detecting audio data corresponding to the animation image data to be displayed in two dimensions, means for converting the detected audio data into video data, and means for causing the video data to be displayed on said displaying means.

12. An image data processing apparatus according to claim 11, wherein the video data displayed on said displaying means contain chrominance data of a color selected to correspond to a selected characteristic of the audio data.

13. An image data processing apparatus, comprising:

an animation image generating source for supplying data representing a series of frames of animation images to be displayed spatially in two dimensions;

sample data producing means for sampling along one direction the animation image data of successive frames received from said animation image generating source while successively moving a sampling position in another direction and producing image data representing a still composite image derived from a plurality of frames of the thus sampled animation image data;

displaying means having a display screen for displaying simultaneously thereon a group of still composite images each derived from a plurality of frames of the still image data received from said sample data producing means;

point designating means for designating a predetermined point of the still images displayed on said display means;

area designating means for designating a predetermined area of the still images displayed on said display means; and time code converting means for producing a first time code corresponding to the predetermined point designated by said point designating means and a second time code corresponding to the area designated by said area designating means.

14. An image data processing apparatus according to claim 13, further comprising insert mode designating means for designating an insert mode, wherein when said insert mode designating means designates an insert mode said animation image generating source inserts animation image data between time codes corresponding to areas designated by said area designating means into a time code corresponding to a point designated by said point designating means.

15. An image data processing apparatus according to claim 13, wherein the time code is displayed as a numerical value on the display screen of said displaying means.

16. An image data processing apparatus according to claim 15, wherein the display screen of said displaying means has a first portion for displaying said group of still images and a monitoring portion on which the animation image data of one image are displayed.

17. An image data processing apparatus according to claim 13, further comprising means for successively detecting audio data corresponding to the animation image data to be displayed two-dimensionally, means for converting the detected audio data into video data for display and means for causing the video data to be displayed on said displaying means.

18. An image data processing apparatus according to claim 17, wherein the video data displayed on said displaying means contain chrominance data of a color selected to correspond to a selected characteristic of the audio data.

19. An image data processing apparatus, comprising:

an animation image generating source for supplying data of a series of frames of animation images to be displayed spatially in two dimensions;

sample data producing means for one-dimensionally sampling along one direction the animation image data of successive frames received from said animation image generating source while successively moving the sampling position in another direction and producing data representing a still composite image derived from a plurality of frames of the thus sampled animation image data;

displaying means having a display screen for displaying simultaneously thereon a group of still composite images each derived from a plurality of frames of the still image data received from said sample data producing means;

a memory for storing therein data representing a plurality of video index formats;

selecting means for selecting data corresponding to one of said video index formats from said memory;

data processing means for arranging the still picture images in accordance with the video index format data selected by said selecting means to produce a selected format; and a video memory for storing therein data representing the selected format produced by said data processing means.

20. An image data processing apparatus according to claim 19, further comprising a printer for printing out data of the selected format from said data processing means.

21. An image data processing apparatus according to claim 19, further comprising an external storage apparatus for recording data of the selected format from said data processing means onto a record medium.

* * * * *